(12) United States Patent
Chen

(10) Patent No.: US 10,903,723 B2
(45) Date of Patent: Jan. 26, 2021

(54) MOTOR POSITIONAL SENSING

(71) Applicant: SZ DJI OSMO TECHNOLOGY CO., LTD., Shenzhen (CN)

(72) Inventor: Zihan Chen, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/107,091

(22) Filed: Aug. 21, 2018

(65) Prior Publication Data

US 2019/0074751 A1 Mar. 7, 2019

Related U.S. Application Data

(63) Continuation of application No. PCT/CN2016/074300, filed on Feb. 22, 2016.

(51) Int. Cl.
*H02K 11/21* (2016.01)
*H02K 11/215* (2016.01)
(Continued)

(52) U.S. Cl.
CPC .......... *H02K 11/215* (2016.01); *G01D 5/145* (2013.01); *H02K 1/2786* (2013.01); *H02K 21/14* (2013.01);
(Continued)

(58) Field of Classification Search
CPC ...... H02K 1/148; H02K 1/182; H02K 1/2793; H02K 5/10; H02K 15/022; H02K 15/03;
(Continued)

(56) References Cited

U.S. PATENT DOCUMENTS 4,217,508 A * 8/1980 Uzuka ................... H02K 29/06
310/156.26
4,286,184 A 8/1981 Koegler et al.
(Continued)

FOREIGN PATENT DOCUMENTS

CN 2847670 Y 12/2006
CN 101938206 A 1/2011
(Continued)

OTHER PUBLICATIONS

Yoshiaki et al., English Machine Translation of JP 2001078392A (Year: 2001).*
(Continued)

*Primary Examiner* — Tulsidas C Patel
*Assistant Examiner* — Rashad H Johnson
(74) *Attorney, Agent, or Firm* — Anova Law Group, PLLC

(57) ABSTRACT

A motor includes a rotor housing, at least one magnet operably coupled to the rotor housing, a stator disposed within the rotor housing, and at least one sensor. The magnet corresponds to a rotor pole that provides a magnetic flux including a main flux and a leakage flux. The stator includes a plurality of stator poles. The main flux is configured to extend in a first direction towards at least one of the stator poles. The at least one sensor is configured to measure the leakage flux. The leakage flux is configured to extend in a second direction towards the at least one sensor. The first direction lies on a radial plane and the second direction lies out of the radial plane.

19 Claims, 11 Drawing Sheets

(51) Int. Cl.
*H02K 29/08* (2006.01)
*H02K 29/06* (2006.01)
*H02P 6/16* (2016.01)
*G01D 5/14* (2006.01)
*H02K 1/27* (2006.01)
*H02K 21/14* (2006.01)
*H02K 1/14* (2006.01)
*H02K 15/03* (2006.01)
*H02K 5/10* (2006.01)

(52) U.S. Cl.
CPC ............ *H02K 29/06* (2013.01); *H02K 29/08* (2013.01); *H02P 6/16* (2013.01); *H02K 1/148* (2013.01); *H02K 5/10* (2013.01); *H02K 15/03* (2013.01)

(58) Field of Classification Search
CPC .. H02K 21/24; H02K 2213/03; H02K 1/2786; H02K 11/215; H02K 29/08; G01D 5/145; H02P 6/16
USPC ............ 310/68 B, 71, 90.5, 156.01, 156.05, 310/156.06, 156.12
See application file for complete search history.

(56) References Cited

U.S. PATENT DOCUMENTS

| | | | | |
|---|---|---|---|---|
| 4,739,203 A | * | 4/1988 | Miyao | H02K 29/08 310/156.44 |
| 5,093,595 A | * | 3/1992 | Korbel | G11B 19/2009 310/156.43 |
| 5,157,295 A | * | 10/1992 | Stefansky | G11B 19/2009 310/156.26 |
| 5,637,945 A | * | 6/1997 | Yamamuro | H02K 1/12 310/156.05 |
| 6,097,120 A | * | 8/2000 | Horng | H02K 5/1735 310/156.05 |
| 6,097,129 A | | 8/2000 | Furtwaengler et al. | |
| 6,454,911 B1 | * | 9/2002 | Xu | G01R 33/10 118/712 |
| 6,868,244 B2 | * | 3/2005 | Koide | G03G 15/757 310/153 |
| 7,608,964 B2 | * | 10/2009 | Yamagiwa | H02K 21/24 310/156.32 |
| 8,072,166 B2 | * | 12/2011 | Takeuchi | H02P 6/26 318/400.17 |
| 2005/0121989 A1 | * | 6/2005 | Suzuki | H02K 21/227 310/156.06 |
| 2008/0174212 A1 | * | 7/2008 | Rudel | H02K 29/08 310/68 B |
| 2009/0230824 A1 | * | 9/2009 | Hornberger | H02K 29/08 310/68 B |

FOREIGN PATENT DOCUMENTS

| | | |
|---|---|---|
| CN | 102111055 A | 6/2011 |
| CN | 201904710 U | 7/2011 |
| CN | 102891579 A | 1/2013 |
| CN | 103825408 A | 5/2014 |
| EP | 0220447 A1 | 5/1987 |
| EP | 1124309 A2 | 8/2001 |
| JP | S63209458 A | 8/1988 |
| JP | H05122878 A | 5/1993 |
| JP | 107327351 A | 12/1995 |
| JP | 2001078392 A * | 3/2001 |
| JP | 2009124865 A | 6/2009 |
| JP | 2011030314 A | 2/2011 |
| WO | 2015020454 A1 | 2/2015 |

OTHER PUBLICATIONS

The World Intellectual Property Organization (WIPO) International Search Report and Written Opinion for PCT/CN2016/074300 dated Nov. 25, 2016 8 pages.

* cited by examiner

MOTOR POSITIONAL SENSING

CROSS-REFERENCE TO RELATED APPLICATION

This application is a continuation of International Application No. PCT/CN2016/074300, filed on Feb. 22, 2016, the entire contents of which are incorporated herein by reference.

BACKGROUND

A brushless DC electric motor uses electronic commutation instead of mechanical commutation to control power distribution to the motor. Brushless DC motors have the following benefits: (1) reliable performance, reduced wear and/or malfunction rate, and a longer service life than that of brushed motors due to electronic commutation instead of mechanical commutation; (2) low no-load current because brushless DC motors are static motors; (3) high efficiency; and (4) small size. One or more position sensors may be used to measure a rotor position in a brushless DC motor. The measured rotor position may be communicated to an electronic controller for implementing brushless motor commutation.

SUMMARY

The rotor position in a brushless DC motor may be determined by a rotation angle of the rotor. The rotation angle can be measured using position sensors such as photoelectric encoders, capacitive encoders, Hall magnetic field directional sensors, and/or potentiometers. The position sensors may be mounted within a motor housing or external to the motor housing. The location of the position sensors in a brushless motor may affect the form factor of the motor. For example, the form factor of a brushless motor may increase when the position sensors are mounted within the motor housing. In some cases, a gap beneath a stator of a brushless motor may need to be widened to accommodate one or more position sensors. Mounting the position sensors external to the motor housing may allow the motor to maintain its form factor. However, this may increase the form factor of a platform that supports the motor. The larger form factor (of the motor and/or its supporting platform) could increase costs and structural/assembly complexity. Furthermore, the use of encoders (such as photoelectric encoders or capacitive encoders) generally adds to the cost of the motors. Potentiometers rely on physical contact between electrical leads for sensing. The electrical leads may wear out and/or corrode over time, leading to reliability issues.

Accordingly, there is a need to incorporate position sensors into brushless DC motors in a compact, efficient and cost-effective manner that utilizes pre-existing spaces within the motor housing. The motors and position sensors provided herein can address the above need. In particular, one or more position sensors can be integrated into a brushless DC motor in a configuration: (1) that allows the rotation angle of the motor to be accurately measured; (2) that does not increase the form factor of the motor housing and/or its supporting platform; and (3) that does not require additional sensors to be mounted external to the motor housing for sensing rotor position. Accordingly, the costs and structural/assembly complexity of the brushless motors (and their supporting platforms) can be reduced using one or more of the following embodiments.

In some aspects of the disclosure, a motor may comprise: a rotor housing; at least one magnet operably coupled to the rotor housing, said magnet corresponding to a rotor pole that provides magnetic flux, wherein the magnetic flux comprises a main flux and a leakage flux; a stator disposed within the rotor housing, said stator comprising a plurality of stator poles, wherein the main flux is configured to extend in a first direction towards at least one stator pole; and at least one sensor configured to measure the leakage flux, wherein the leakage flux is configured to extend in a second direction towards the sensor, and wherein the first direction lies on a radial plane and the second direction lies outside of the radial plane.

According to another aspect of the disclosure, an apparatus may comprise: a frame assembly adapted to hold a device; and a motor coupled to the frame assembly, wherein the motor is configured to directly drive the frame assembly in response to one or more motor signals so as to allow the device to rotate around at least one of a pitch, roll, and yaw axes of the device. The motor may comprise: a rotor housing; at least one magnet operably coupled to the rotor housing, said magnet corresponding to a rotor pole that provides magnetic flux, wherein the magnetic flux comprises a main flux and a leakage flux; a stator disposed within the rotor housing, said stator comprising a plurality of stator poles, wherein the main flux is configured to extend in a first direction towards at least one stator pole; and at least one sensor configured to measure the leakage flux, wherein the leakage flux is configured to extend in a second direction towards the sensor, and wherein the first direction lies on a radial plane and the second direction lies outside of the radial plane.

A system may be provided in accordance with an additional aspect of the disclosure. The system may comprise: an unmanned vehicle; and an apparatus that is mounted on the unmanned vehicle. The apparatus may comprise: a frame assembly adapted to hold a device; and a motor coupled to the frame assembly, wherein the motor is configured to directly drive the frame assembly in response to one or more motor signals so as to allow the device to rotate around at least one of a pitch, roll, and yaw axes of the device. The motor may comprise: a rotor housing; at least one magnet operably coupled to the rotor housing, said magnet corresponding to a rotor pole that provides magnetic flux, wherein the magnetic flux comprises a main flux and a leakage flux; a stator disposed within the rotor housing, said stator comprising a plurality of stator poles, wherein the main flux is configured to extend in a first direction towards at least one stator pole; and at least one sensor configured to measure the leakage flux, wherein the leakage flux is configured to extend in a second direction towards the sensor, and wherein the first direction lies on a radial plane and the second direction lies outside of the radial plane.

Further aspects of the disclosure may be directed to a method for controlling a motor. The method may comprise: measuring, with an aid of the sensor of any one of the preceding claims, at least the leakage flux that extends in the second direction towards the sensor; determining a rotational position of a rotor using the measured leakage flux, said rotor being operably coupled to the rotor housing; and controlling actuation of the motor based on the determined rotational position of the rotor.

According to another aspect of the disclosure, a motor may comprise: a rotor housing comprising at least one magnet having an inner surface, an outer surface, and an edge surface located between the inner surface and the outer surface; a stator comprising at least one distal portion and a base, wherein the stator is disposed within the rotor housing, wherein said distal portion is configured to face the inner surface of the magnet, and wherein the base is configured to support said distal portion; and at least one sensor positioned in a gap between the edge surface of the magnet and a flange portion of the base, wherein said flange portion is configured to face the edge surface of the magnet, and wherein the edge surface and the inner surface of the magnet lie on planes that are non-parallel to each other.

In some aspects of the disclosure, an apparatus may comprise: a frame assembly adapted to hold a device; and a motor coupled to the frame assembly. The motor may be configured to directly drive the frame assembly in response to one or more motor signals so as to allow the device to rotate around at least one of a pitch, roll, and yaw axes of the device. The motor may comprise: a rotor housing comprising at least one magnet having an inner surface, an outer surface, and an edge surface located between the inner surface and the outer surface; a stator comprising at least one distal portion and a base, wherein the stator is disposed within the rotor housing, wherein said distal portion is configured to face the inner surface of the magnet, and wherein the base is configured to support said distal portion; and at least one sensor positioned in a gap between the edge surface of the magnet and a flange portion of the base, wherein said flange portion is configured to face the edge surface of the magnet, and wherein the edge surface and the inner surface of the magnet lie on planes that are non-parallel to each other.

A system may be provided in accordance with an additional aspect of the disclosure. The system may comprise: an unmanned vehicle; and an apparatus that is mounted on the unmanned vehicle. The apparatus may comprise: a frame assembly adapted to hold a device; and a motor coupled to the frame assembly. The motor may be configured to directly drive the frame assembly in response to one or more motor signals so as to allow the device to rotate around at least one of a pitch, roll, and yaw axes of the device. The motor may comprise: a rotor housing comprising at least one magnet having an inner surface, an outer surface, and an edge surface located between the inner surface and the outer surface; a stator comprising at least one distal portion and a base, wherein the stator is disposed within the rotor housing, wherein said distal portion is configured to face the inner surface of the magnet, and wherein the base is configured to support said distal portion; and at least one sensor positioned in a gap between the edge surface of the magnet and a flange portion of the base, wherein said flange portion is configured to face the edge surface of the magnet, and wherein the edge surface and the inner surface of the magnet lie on planes that are non-parallel to each other.

Further aspects of the disclosure may be directed to a method for determining a rotational position of a rotor in a motor. The method may comprise: measuring a leakage flux using at least one sensor as the rotor rotates relative to a stator; and determining the rotational position of the rotor based on the measured leakage flux, wherein a magnet associated with the rotor is configured to generate a main flux and the leakage flux, wherein the main flux is configured to extend in a first direction towards the stator and the leakage flux is configured to extend in a second direction towards the sensor, and wherein the first direction lies on a radial plane and the second direction lies outside of the radial plane.

An apparatus for determining a rotational position of a rotor in a motor may be provided in accordance with an additional aspect of the disclosure. The apparatus may comprise one or more processors that are, individually or collectively, configured to: receive a signal indicative of a measured leakage flux, wherein the leakage flux is measured using at least one sensor as the rotor rotates relative to a stator; and process the signal to determine the rotational position of the rotor based on the measured leakage flux, wherein a magnet associated with the rotor is configured to generate a main flux and the leakage flux, wherein the main flux is configured to extend in a first direction towards the stator and the leakage flux is configured to extend in a second direction towards the sensor, and wherein the first direction lies on a radial plane and the second direction lies outside of the radial plane.

In some aspects of the disclosure, a non-transitory computer-readable medium storing instructions that, when executed, causes a computer to perform a method for determining a rotational position of a rotor in a motor may be provided. The method may comprise: receiving a signal indicative of a measured leakage flux, wherein the leakage flux is measured using at least one sensor as the rotor rotates relative to a stator; and processing the signal to determine the rotational position of the rotor based on the measured leakage flux, wherein a magnet associated with the rotor is configured to generate a main flux and the leakage flux, wherein the main flux is configured to extend in a first direction towards the stator and the leakage flux is configured to extend in a second direction towards the sensor, and wherein the first direction lies on a radial plane and the second direction lies outside of the radial plane.

It shall be understood that different aspects of the disclosure can be appreciated individually, collectively, or in combination with each other. Various aspects of the disclosure described herein may be applied to any of the particular applications set forth below or for any other types of motors and/or stabilizing platforms. Any description herein of a movable object may apply to and be used for any manned or unmanned vehicle. Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

A motor having at least one position sensor may be provided in accordance with embodiments of the disclosure. The position sensor may be integrated into the motor in a configuration: (1) that allows a rotation angle of the motor to be accurately measured; (2) that does not increase the form factor of the motor housing and/or its supporting platform; and (3) that does not require any additional rotational position sensors to be mounted external to the motor housing. Although various embodiments of the disclosure are described herein with respect to a brushless motor, it should be appreciated that the disclosure can also be applied to direct current (DC) brush motors, rotational motors, servo motors, direct-drive rotational motors, DC torque motors, linear solenoids stepper motors, ultrasonic motors, geared motors, speed-reduced motors, hydraulic actuators, pneumatic actuators, or piggybacked motor combinations. In some cases, direct-drive motors may include compact motors or miniaturized motors, and can be controlled in a stepless fashion, reducing response time, and enabling fast and timely adjustment in response to various posture changes of the supporting platform.

Next, various embodiments of the disclosure will be described in detail below with reference to the figures.

Figure 1:
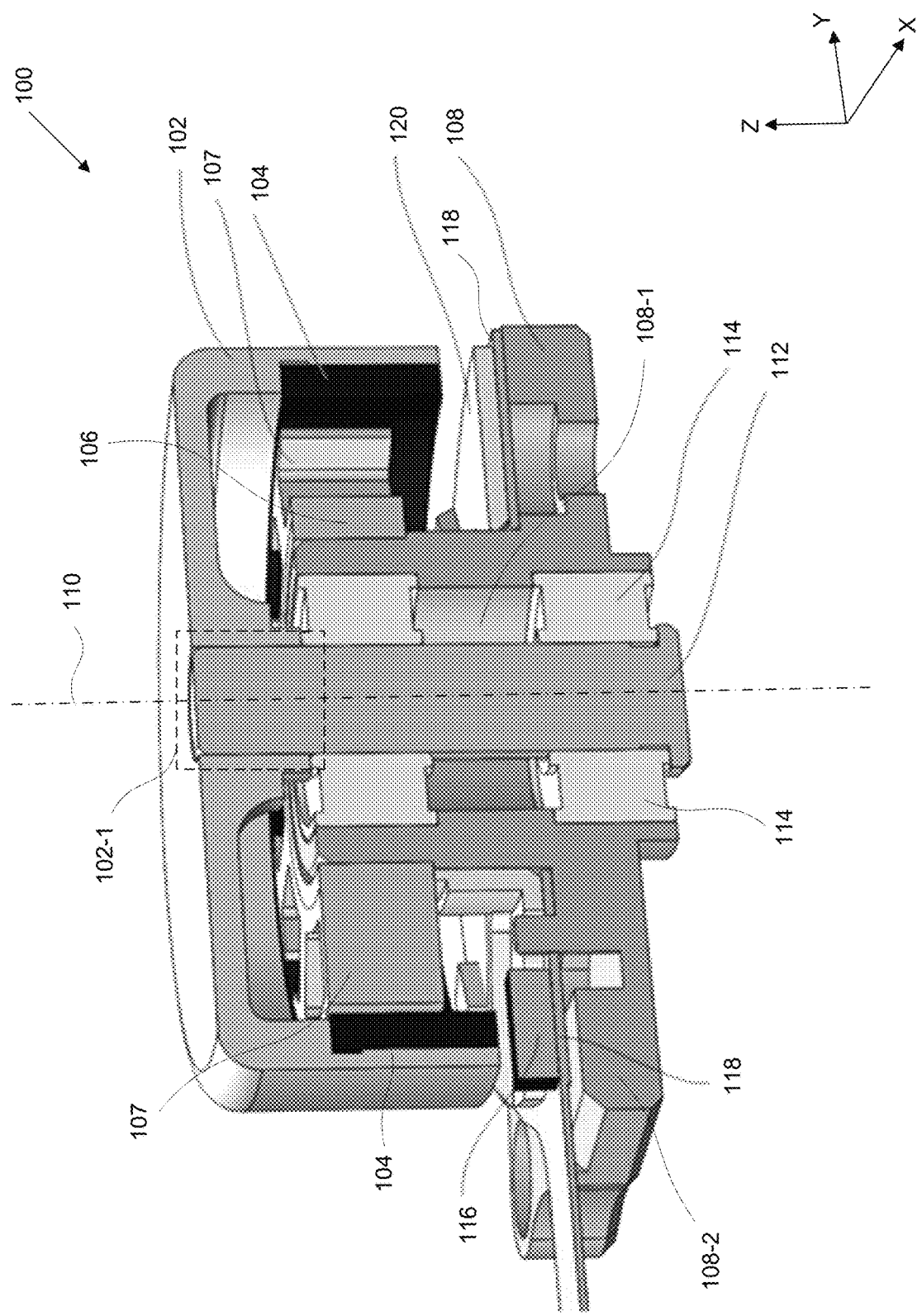
FIG. 1 is a perspective view of a cross-section of a brushless motor, in accordance with some embodiments.

FIG. 1 is a perspective view of a cross-section of a brushless motor, in accordance with some embodiments. A brushless motor 100 is provided. The brushless motor may be a brushless direct-current electric (BLDC) motor. A BLDC motor is also known as an electronically commutated (EC) motor. A BLDC motor is a synchronous motor that is powered by a DC electric source via an integrated inverter/switching power supply, which produces an alternating electric signal to drive the motor. The alternating electric signal comprises a bi-directional current. Brushless motors offer several advantages over brushed DC motors, including high torque to weight ratio, more torque per watt (increased efficiency), increased reliability, reduced noise, longer lifetime (no brush and commutator erosion), elimination of ionizing sparks from the commutator, and overall reduction of electromagnetic interference (EMI).

As shown in FIG. 1, the brushless motor 100 may comprise a rotor housing 102 and at least one rotor magnet 104 operably coupled to the rotor housing. The rotor magnet may correspond to at least one rotor pole that provides magnetic flux. In some embodiments, the rotor magnet may be a permanent magnet, and the at least one rotor pole may be a N-pole or a S-pole. The rotor magnet may be made of a magnetic material such as ferrite or bonded NdFeB. In some embodiments, a plurality of magnets 104 may be provided. The plurality of magnets may correspond to a plurality of rotor poles. The plurality of rotor poles may be opposing poles provided in an alternating configuration (e.g., N-S-N-S-N-S). The plurality of rotor poles may be configured to generate magnetic flux. The brushless motor of FIG. 1 may be a permanent-magnet synchronous motor" (PMSM). A PMSM is a synchronous motor that uses permanent magnets instead of windings in the rotor/rotor housing.

The motor may also comprise a stator 106 disposed within the rotor housing. In some embodiments, the stator may be disposed coaxially within the rotor housing. The stator may comprise a plurality of stator poles 107. The stator may comprise n number of stator poles, where n may be any integer that is greater than 1. The plurality of stator poles may be disposed at distal portions of the stator. For example, the stator poles may be distributed radially at the distal portions of the stator, as shown in FIG. 1. The stator may further comprises a base 108 configured to support at least one stator pole. In some embodiments, the base and the stator pole(s) may be formed as a single body. Alternatively, the base and the stator pole(s) may be formed separately and assembled into one body.

The stator and the rotor housing may be coaxially aligned about a rotational axis 110. The motor may further comprise a rotor 112 operably coupled to the rotor housing. The rotor may be mounted onto the rotor housing, and may be affixed to a portion of the rotor housing. The portion may correspond to a central portion 102-1 of the rotor housing. The rotor may be rigidly attached to the rotor housing. Optionally, the rotor may be detachable from the rotor housing. The rotor may be disposed coaxially with the rotor housing and the stator. A plurality of bearings 114 may be disposed between the rotor and an inner surface 108-1 of the base, such that the rotor housing and the rotor are rotatably coupled to the stator. Accordingly, the rotor and the rotor housing can rotate as a single body relative to the stator about the rotational axis.

The brushless motor may further comprise at least one position sensor 116 configured to measure a portion of the magnetic flux generated from the rotor pole(s). The portion of the magnetic flux may correspond to a leakage flux that extends from an edge surface of the magnet towards the position sensor. Another portion of the magnetic flux may correspond to a main flux that extends from an inner surface of the magnet towards at least one stator pole. The position sensor may be configured to substantially measure a density of the leakage flux, without measuring a density of the main flux. The main flux may extend in a first direction towards at least one stator pole, and the leakage flux may extend in a second direction towards the position sensor. The first direction may lie on a radial plane and the second direction may lie outside of the radial plane, as described in detail later in the specification.

The position sensor may be disposed in a gap between the rotor magnet and a flange portion 108-2 of the stator base. The gap may be an airgap. The position sensor may be disposed horizontally with respect to a surface of the flange portion. In some embodiments, a width of the gap may range from about 1 mm to about 2 mm. Alternatively, the width of the gap may be less than about 2 mm. Optionally, the width of the gap may be greater than about 2 mm. In some embodiments, a thickness of the gap may range from about 0.3 mm to about 1 mm. Alternatively, the thickness of the gap may be less than about 0.5 mm. Optionally, the thickness of the gap may be greater than about 1 mm. A ratio of a height (or thickness) of the gap to a height of the sensor may be greater than 1. In some embodiments, the gap may have a dimension of no more than about 1 mm in height.

In some embodiments, the sensor may be disposed on a flexible printed circuit (FPC) 118, and may be electrically connected to the FPC. The FPC may include one or more circuit elements such as capacitors, resistors, and inductors. The FPC may be disposed on the flange portion of the stator base. In some embodiments, the FPC may be disposed between the flange portion of the stator base and a pressure sheet 120. The pressure sheet may be laminated onto a portion of the FPC using an adhesion layer. The pressure sheet may serve as a substrate for the FPC. Alternatively, the pressure sheet may serve as a protection layer for the FPC. The pressure sheet may also reinforce the structural integrity of the FPC by reducing warpage of the FPC. Additionally, the pressure sheet may be configured to provide electromagnetic (EM) shielding to the FPC. The pressure sheet may be made of any rigid material (e.g., metal or plastic).

The brushless motor may further comprise a plurality of windings (not shown) around the stator. In the example of FIG. 1, the stator may be a radial winding stator. In a radial winding stator, each stator pole extends radially from a circumference of a stator hub to form a radially extended portion, and tangentially expands at an end of the radially extended portion to form a tangentially extended portion. In some alternative embodiments, the stator may be an axial winding stator. In an axial winding stator, each stator pole extends transversely around a circumference of a stator hub in a direction that is orthogonal to a radial direction.

The plurality of windings and the stator are converted into electromagnets (stator poles) when a current is passed through the windings. The current may be, for example, a 3-phase current. An electronic controller may be configured to generate sinusoidal currents for energizing the windings on the stator to drive the rotor. The electronic controller may be configured to direct rotation of the rotor. The electronic controller may be configured to determine an orientation/position of the rotor relative to the stator, by using one or more position sensors to measure a rotational position of the rotor.

The brushless motor may be powered by a direct current (DC) electric source via a switching power supply. The switching power supply may be an integrated inverter. The switching power supply may be configured to generate a bi-directional direct current. In some cases, the bi-directional direct current may have a sinusoidal waveform. Alternatively, the bi-directional direct current may have a square waveform. Optionally, the bi-directional direct current may have a saw-tooth waveform. Any type of waveform for the bi-directional direct current may be contemplated.

In some embodiments, the brushless motor may have an outrunner (external-rotor) configuration. A plurality of windings of the stator may be connected in a Wye (Y-shaped) configuration (not shown). An end of each winding may be connected to a central point, so as to form a plurality of parallel circuits, and power may be applied to the other end of each winding. The Wye (Y-shaped) configuration motor may be configured to generate a torque ranging from about 0 Nm to about 0.1 Nm at a speed ranging from about 0 rpm to about 200 rpm. The electronic controller may control and pass a direct current through a plurality of non-adjacent windings to alternately energize the non-adjacent windings, based on rotor position feedback from the sensor. The plurality of non-adjacent windings may be switched on and off at high frequency for voltage modulation.

In some embodiments, the position sensor may also be configured to operate as an electronic switch for switching of the stator windings. The position sensor may be configured to operate in a binary on/off mode. Alternatively, the position sensor need not be operated in a binary on/off mode, and may be configured to operate in a continuous on/off mode.

Figure 2A:
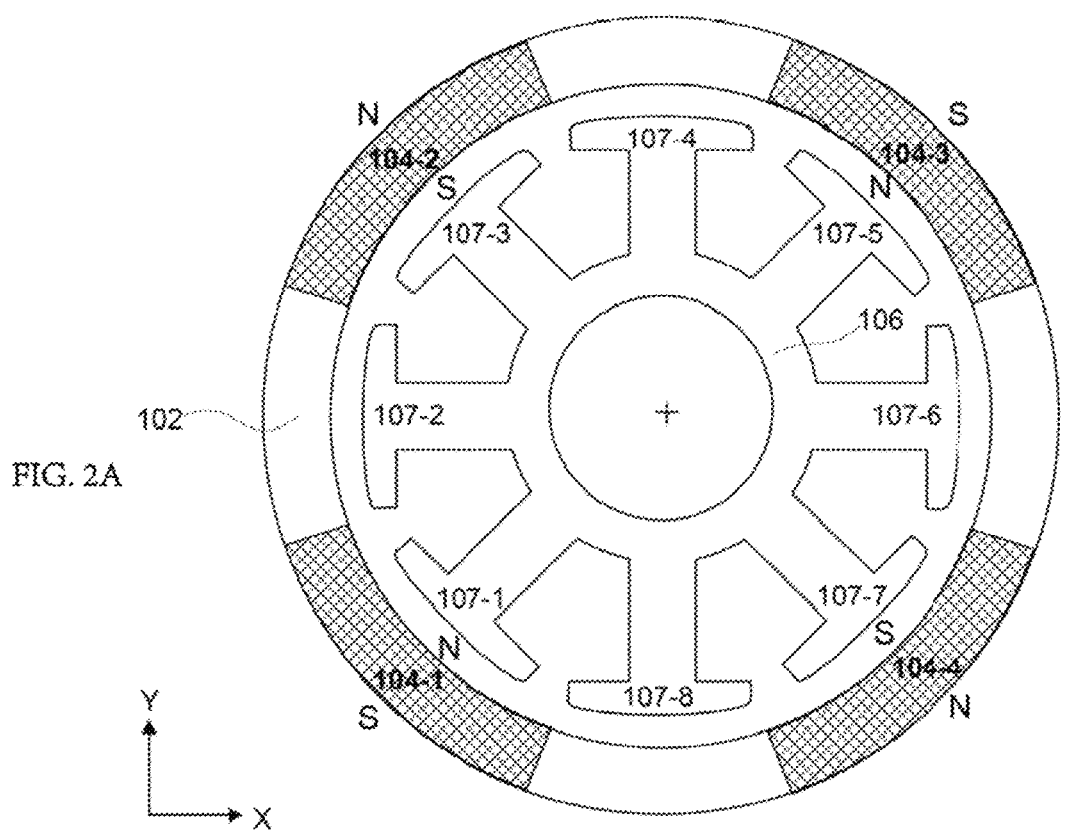
FIGS. 2A and 2B are top views of a rotor housing comprising a plurality of rotor magnets and a stator comprising a plurality of stator poles, in accordance with some embodiments.

FIG. 2A is a top view of a rotor housing comprising a plurality of rotor magnets and a stator comprising a plurality of stator poles, in accordance with some embodiments. As shown in FIG. 2A, a rotor housing 102 may comprise a plurality of rotor magnets 104. The rotor magnets may be attached to an inner surface of the rotor housing. Alternatively, the rotor magnets may be embedded within the rotor housing. Any number of rotor magnets may be provided. In FIG. 2A, a first rotor magnet 104-1, a second rotor magnet 104-2, a third rotor magnet 104-3, and a fourth rotor magnet 104-4 may be provided at different sections (e.g., different quadrants) of the rotor housing.

Each rotor magnet may be a permanent magnet. Each rotor magnet may correspond to a single rotor pole (N-pole or S-pole). Alternatively, each rotor magnet may comprise a north-pole magnet and a south-pole magnet. For example, each rotor magnet may comprise a pair of opposing rotor poles (a N-pole and a S-pole). A plurality of rotor poles may be provided in an alternating configuration (e.g., N-S-N-S) using a plurality of rotor magnets, for example as shown in FIG. 2A. A rotor pole on an inner portion of a rotor magnet may have opposite polarity to a rotor pole on a corresponding outer portion of the rotor magnet. The plurality of rotor poles may be configured to generate magnetic flux.

A stator 106 may comprise a plurality of stator poles 107 extending radially out towards the distal portions of the stator. Any number of stator poles may be provided. In FIG. 2A, eight stator poles may be provided (107-1, 107-2, 107-3, 107-4, 107-5, 107-6, 107-7, and 107-8). The rotor poles may face the stator poles in an alternating manner when the rotor housing (and rotor) rotates relative to the stator about the Z rotational axis.

Each rotor pole may be provided by a rotor magnet in the rotor housing. Likewise, each stator pole may be provided by an electromagnet in the stator. A number of rotor poles in the rotor housing may be the same as a number of stator poles in the stator. For example, in some embodiments, the number of rotor poles and the number of stator poles may each be n, whereby n may be any integer greater than 1. Alternatively, a number of rotor poles in the rotor housing may be different from the number of stator poles in the stator. For example, in some embodiments, the number of rotor poles may be 8 (4 pairs of rotor poles) and the number of stator poles may be 9. It should be noted that any number of rotor poles and stator poles may be contemplated, depending on the positioning accuracy, speed, torque, and/or weight considerations of the brushless motor applications.

Figure 2B:
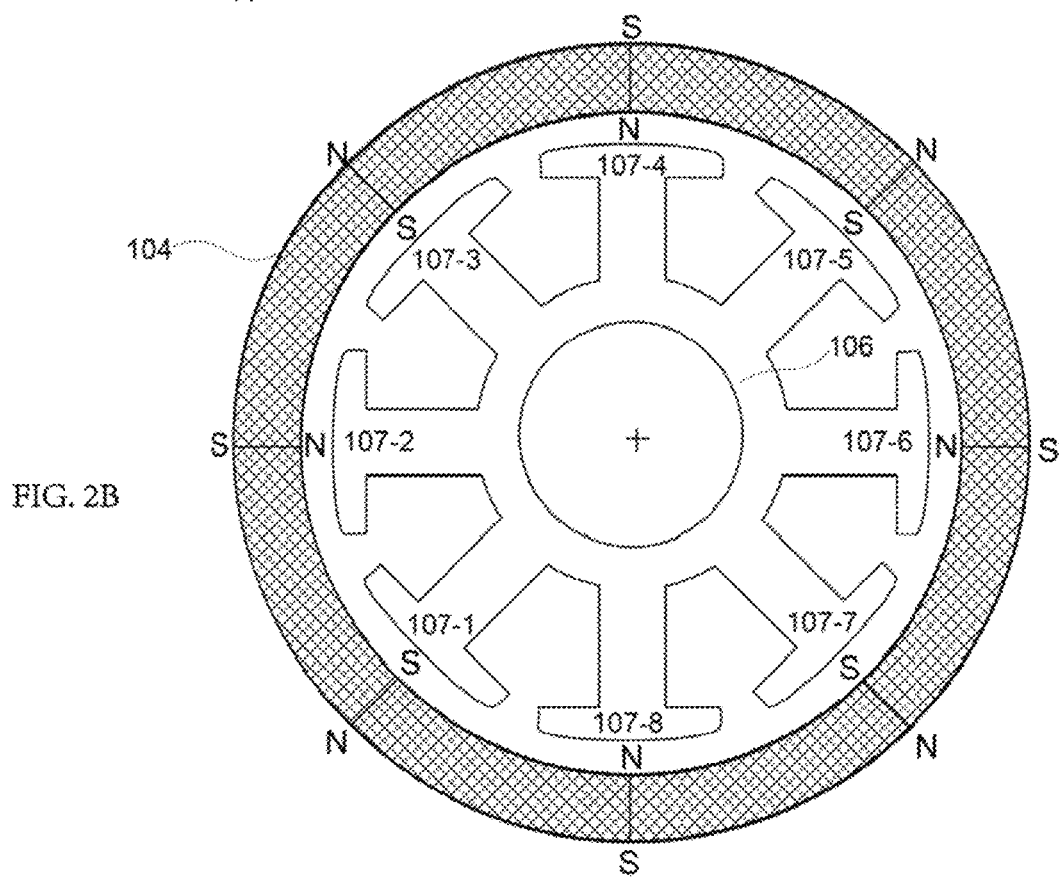

In some embodiments, the rotor magnet may be a closed annular ring. An edge surface of the closed annular ring may be configured to directly face the position sensor. The closed annular ring may comprise a plurality of alternating opposing poles. FIG. 2B shows an example of a closed annular ring rotor magnet. The rotor magnet in FIG. 2B may be formed as a single piece of magnet having a plurality of alternating opposing poles (e.g., N-S-N-S-N-S-N-S).

In some other embodiments, the rotor magnet may be an open annular ring comprising a plurality of annular sections (e.g., as shown in FIG. 2A). The annular sections may comprise a plurality of alternating opposing poles. The plurality of annular sections may be spaced apart at a predetermined interval. For example, the predetermined interval ranges from about 0.5 mm to about 2 mm. The plurality of annular sections may also be spaced apart by a predetermined spacing. For example, the predetermined spacing may range from about 3 mm to about 10 mm. The plurality of annular sections may be spaced apart by a predetermined angle. For example, the predetermined angle may range from about 45 degrees to about 90 degrees.

Figure 3:
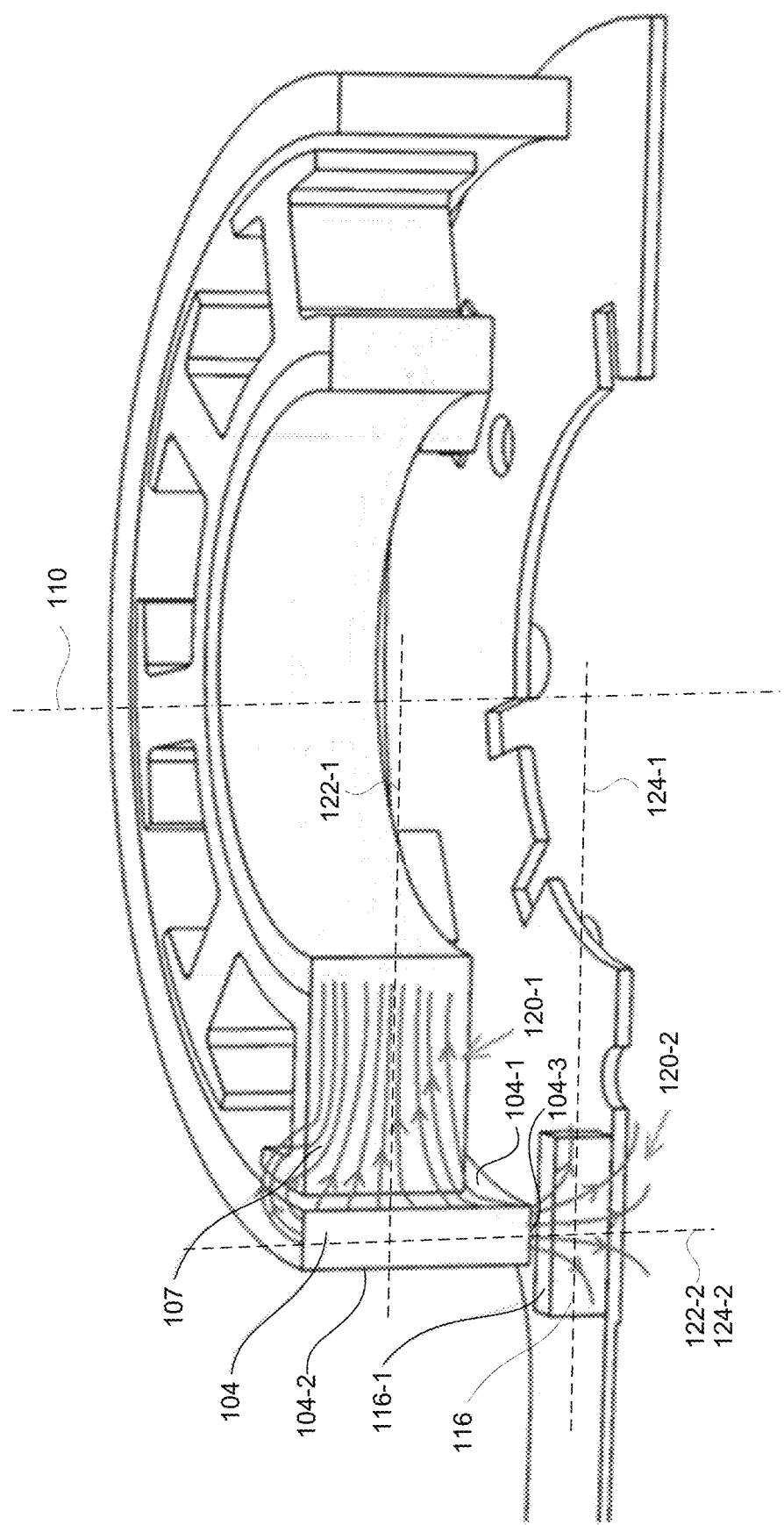
FIG. 3 is a perspective view of a cross-section of a brushless motor and further illustrates components of a magnetic flux, in accordance with some embodiments.

FIG. 3 is a perspective view of a cross-section of a brushless motor and further illustrates the components of the magnetic flux generated by the rotor pole(s), in accordance with some embodiments. As shown in FIG. 3, a rotor magnet 104 may correspond to at least one rotor pole that provides magnetic flux 120. The magnetic flux may comprise a plurality of flux lines. The magnetic flux may comprise a main flux 120-1 and a leakage magnetic 120-2.

A plurality of rotor magnets 104 may be provided in the brushless motor. The plurality of rotor magnets may correspond to a plurality of rotor poles. For example, as previously shown in FIG. 2, each rotor magnet may comprise a pair of opposing rotor poles. The plurality of rotor poles may be opposing rotor poles provided in an alternating configuration (e.g., N-S-N-S-N-S-N-S). The plurality of rotor poles may be configured to generate magnetic flux comprising the main flux and the leakage flux.

A position sensor 116 may be configured to measure the leakage flux. The main flux may extend in a first direction 122-1 towards at least one stator pole, and the leakage flux may extend in a second direction 122-2 towards the sensor. The first direction and the second direction may be different. For example, the first direction may be a radial direction and the second direction may be an axial direction. The radial direction and the axial direction may be substantially orthogonal to each other. The axial direction may be substantially parallel to the rotational axis 110 of the motor. The main flux may extend in the first direction towards the rotational axis.

The first direction and the second direction may also lie on different planes. For example, the first direction may lie on a radial plane and the second direction may lie outside of the radial plane on an axial plane. The radial plane and the axial plane may be substantially orthogonal to each other. A longitudinal axis 124-1 extending through the sensor may be parallel with the radial direction. A transverse axis 124-2 extending through the sensor may be parallel (and/or coincident) with the axial direction.

In some embodiments, the leakage flux may extend outwardly in a plurality of directions. The plurality of directions may lie substantially in the axial direction, and may be orthogonal to the radial direction.

The leakage flux may have a substantially lower magnetic field strength than the main flux. In some embodiments, the leakage flux may have a magnetic field strength ranging from about 800 A/m to about 8000 A/m, and the main flux may have a magnetic field strength ranging from about 8000 A/m to about 80000 A/m. The leakage flux may also have a substantially lower magnetic flux density than the main flux. In some embodiments, the leakage flux may have a magnetic flux density ranging from about 0.01 T to about 0.1 T, and the main flux may have a magnetic flux density ranging from about 0.1 T to about 1 T. It is noted that the magnetic flux density and field strength of the leakage flux generally decreases with increasing distance away from the rotor pole.

As shown in FIG. 3, the rotor magnet may have an inner surface 104-1, an outer surface 104-2, and an edge surface 104-3 located between the inner surface and the outer surface. The inner surface and the edge surface of the rotor magnet may lie on different planes. The inner surface and the edge surface of the rotor magnet may lie on planes that are non-parallel to each other. In some embodiments, the inner surface and the edge surface may be substantially orthogonal to each other.

The brushless motor may comprise a stator having a plurality of stator poles 107. Each stator pole may correspond to a distal portion of the stator. The stator poles may be configured to face the inner surface of the rotor magnet as the rotor housing rotates relative to the stator. The stator poles may be further configured to align with the inner surface of the rotor magnet in the first direction 122-1. The stator poles may be disposed annularly and adjacent to the inner surface of the rotor magnet. At least one stator pole may directly face the inner surface of at least one rotor magnet at an instantaneous point in time as the rotor housing rotates relative to the stator.

Referring back to FIG. 1, the rotor magnet may be disposed on an interior surface of the rotor housing. For example, the rotor magnet may be located in a gap between the interior surface of the rotor housing and the stator poles. The outer surface of the rotor magnet may be in direct contact with the interior surface of the rotor housing. Alternatively, the rotor magnet may be embedded within the interior surface of the rotor housing such that the inner surface of the rotor magnet is flushed or aligned with the interior surface of the rotor housing. Optionally, the rotor magnet may be completely embedded within the interior surface of the rotor housing such that only the edge surface of the rotor magnet is exposed to face the position sensor. The inner surface and the outer surface of the rotor magnet may be laterally opposite to each other. In some embodiments, the inner surface and the outer surface of the rotor magnet may be concentric to each other, for example as shown in FIG. 2. The edge surface of the rotor magnet may be substantially orthogonal to each of the inner surface and the outer surface of the rotor magnet.

The position sensor may be positioned in a location proximal to the edge surface of the rotor magnet, such that majority of the magnetic flux from the rotor magnet that is measured by the position sensor extends from the edge surface as the leakage flux. The position sensor may be positioned underneath the edge surface of the rotor magnet. For example, the position sensor may be positioned in a gap between the edge surface of the rotor magnet and the flange portion of the stator base. The flange portion may be configured to face the edge surface of the rotor magnet. The position sensor may be placed horizontally in a gap underneath the edge surface of the rotor magnet. Horizontal placement of the position sensor allows the position sensor to be disposed in an existing gap inside the brushless motor, without needing to increase the volume (form factor) of the motor. The position sensor may be configured to face the edge surface of the rotor magnet, and to align with the edge surface of the rotor magnet in the second direction (axial direction). A top surface 116-1 of the position sensor may be configured to directly face the edge surface of the rotor magnet at an instantaneous point in time as the rotor housing rotates relative to the stator. The position sensor may be configured in an orientation to the rotor magnet such that the position sensor avoids detection of the main flux extending towards the stator pole. A transverse axis (e.g., transverse axis 124-2) extending through the position sensor may be normal to the edge surface of the rotor magnet when the position sensor is directly underneath the edge surface of the rotor magnet.

The position sensor may be configured to detect a position of the rotor magnet. The position sensor may be a magnetic field sensor. The position of the rotor magnet may be indicative of a position of the rotor housing and the rotor. The position sensor may be configured to measure a flux density of the leakage flux. The position sensor may have a linear response to the measured flux density of the leakage flux. An output voltage of the position sensor may vary linearly with the measured flux density of the leakage flux. Additionally, the output voltage of the position sensor may vary in response to a change in the leakage flux as the rotor housing rotates relative to the stator.

The position sensor may be configured to detect a rotational position of the rotor pole based on the measured leakage flux as the rotor housing rotates relative to the stator. The position sensor may be configured to detect the rotational position of the rotor pole without measuring the magnetic flux density of the main flux. The position sensor may be configured to generate a measurement signal that is indicative of the flux density of the leakage flux. In some embodiments, the measurement signal may have a substantially sinusoidal waveform shape. In other embodiments, the measurement signal may have a square waveform shape. In other embodiments, the measurement signal may have a square waveform shape. Any other type of waveform shape for the measurement signal may be contemplated or generated.

As previously described, the rotor may be operably coupled to the rotor housing. Accordingly, the rotational position of the rotor may be associated with the rotational position of the rotor pole. The rotational position of the rotor may be determined from the rotational position of the rotor pole, and may be determined based on the measured leakage flux. An electronic controller may be configured to control actuation of the brushless motor based on the determined rotational position of the rotor. As previously mentioned, the rotational position of the rotor can be determined by measuring a magnetic flux density of the leakage flux, and without measuring a magnetic flux density of the main flux.

Figure 4:
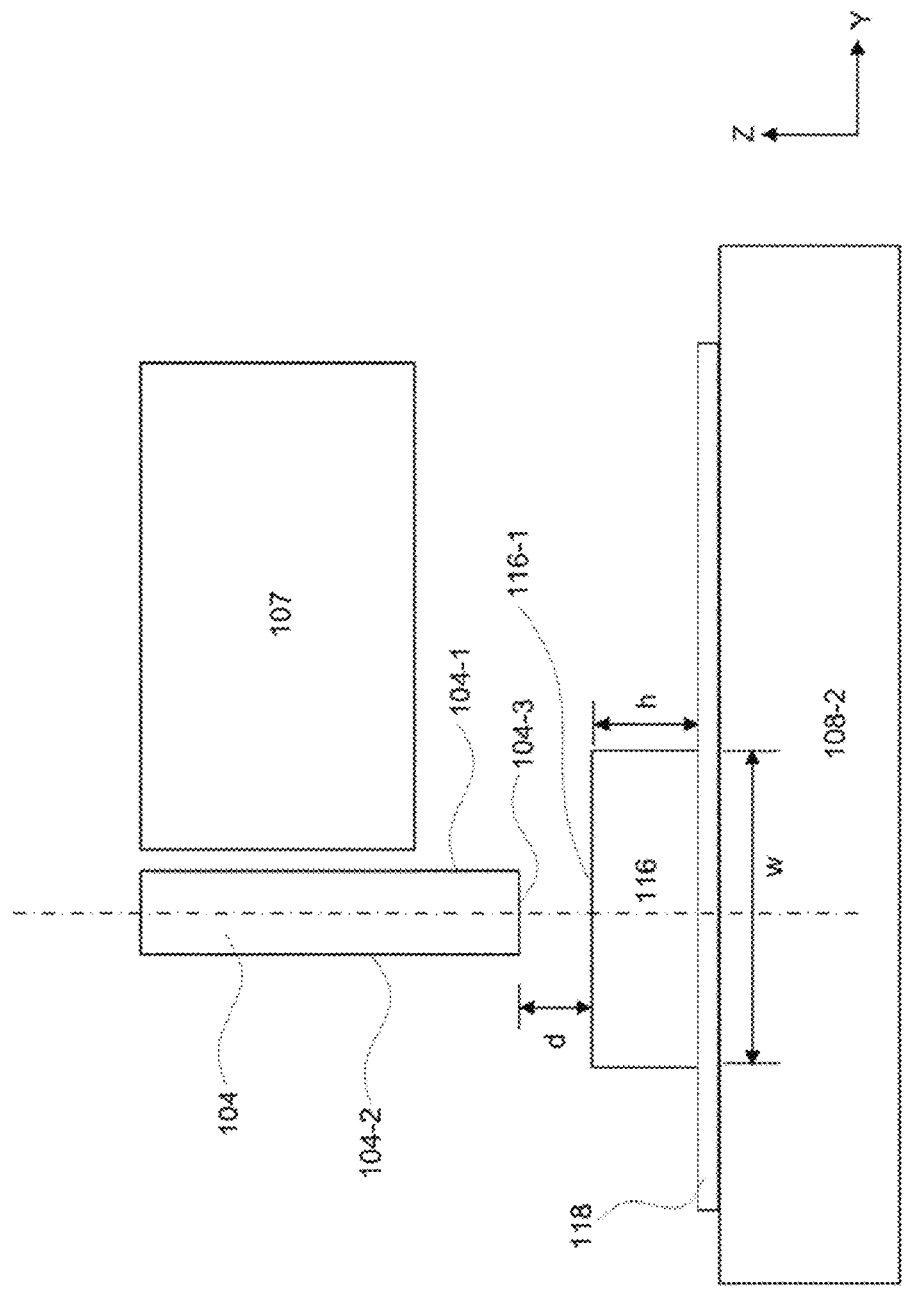
FIG. 4 is a side view of a cross-section of a brushless motor, in accordance with some embodiments.

FIG. 4 is a side view of a cross-section of a brushless motor, in accordance with some embodiments. Specifically, FIG. 4 illustrates the spatial configuration of a position sensor relative to an edge surface of a rotor magnet.

In FIG. 4, the edge surface 104-3 of the rotor magnet 104 may be configured to overlap the top surface 116-1 of the position sensor 116 at an instantaneous point in time as the rotor housing rotates relative to the stator. A distance d may be defined from the top surface of the position sensor to the edge surface of the rotor magnet when the sensor is positioned nearest to the edge surface of the rotor magnet. The distance d may correspond to a shortest distance between the top surface of the position sensor and the edge surface of the rotor magnet. The distance d may be measured by a straight line extending perpendicularly between the top surface of the position sensor and the edge surface of the rotor magnet. In some embodiments, the distance d may range from about 0.2 mm to about 0.8 mm. Alternatively, the distance d may be less than or equal to about 1.5 mm. Optionally, the distance d may be greater than or equal to about 1.5 mm. The top surface of the position sensor and the edge surface of the rotor magnet may be separated by an airgap. A height of the airgap may be given by the distance d.

In some embodiments, the position sensor may be a linear magnetic field sensor. For example, the sensor may be a linear Hall effect sensor. The linear Hall effect sensor may be of a horizontal-type configuration. The linear Hall effect sensor may be disposed horizontally with respect to a surface of a flexible printed circuit (e.g., FPC 118). In some embodiments, a height h of the position sensor may range from about 0.8 mm to about 1.6 mm. Alternatively, the height h of the position sensor may be less than about 2 mm. Optionally, the height h of the position sensor may be greater than about 1.6 mm. In some embodiments, a width w of the position sensor may range from about 1 mm to about 1.5 mm. Alternatively, the width w of the position sensor may be less than about 3 mm. Optionally, the width w of the position sensor may be greater than about 1.5 mm. Any values for the height and width of the position sensor may be contemplated, depending on a size of the gap in which the position sensor is disposed.

Figure 5:
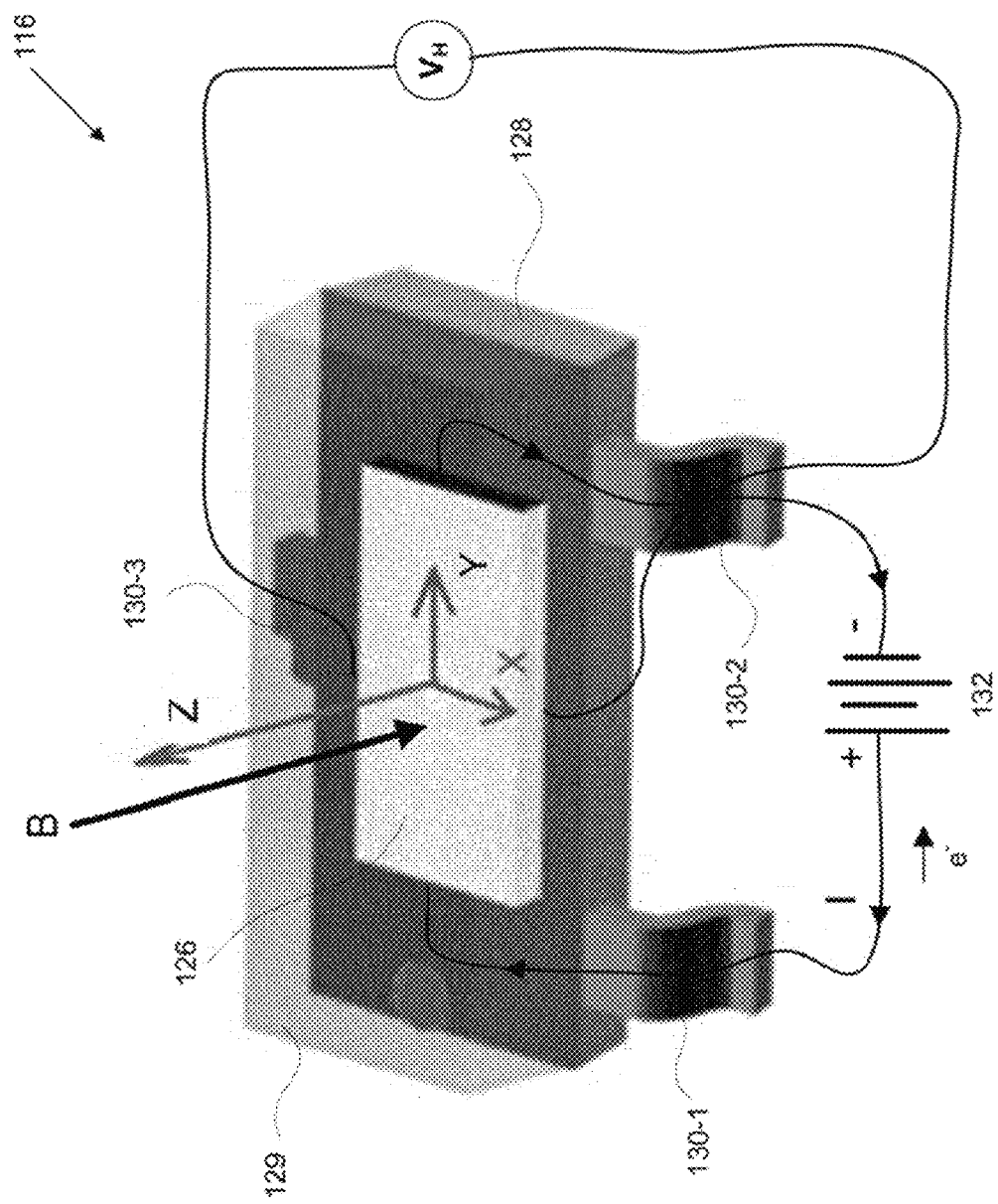
FIG. 5 is a perspective view of a position sensor that is a Hall effect sensor, in accordance with some embodiments.

FIG. 5 is a perspective view of a position sensor that is used in a brushless motor, in accordance with some embodiments. A position sensor 116 may be a linear Hall effect sensor. A Hall effect sensor is a solid state magnetic sensor device, and can be used for sensing position, velocity, and/or directional movement. Advantages of Hall effect sensors include non-contact wear free operation, low maintenance, robust design, and low susceptibility to vibration, dust and moisture as a result of their robust packaging.

A Hall effect sensor is a transducer that varies its output voltage in response to a magnetic field. The magnetic field is sensed by a Hall plate and a "Hall" voltage is developed across the biased Hall plate proportional to the induced magnetic flux. The Hall voltage is a potential difference that depends on both the magnitude and directions of the magnetic field and an electric current from a power supply. The Hall effect sensor operates as an analog transducer, directly returning an output voltage. With a known magnetic field, the distance from a pole of the magnetic field to the Hall plate can be determined. The Hall effect sensor can produce a linear output. The output signal for a linear analog Hall effect sensor can be obtained directly from the output of an operational amplifier, with the output voltage being directly proportional to the magnetic field passing through the Hall effect sensor.

Referring to FIG. 5, the Hall effect sensor may comprise a Hall plate 126 mounted onto a substrate 128. The Hall plate may be a thin square of semiconductor or metal having a thickness t. A sensor cover 129 may be attached onto the substrate to encapsulate the Hall plate. The sensor cover may serve to protect the Hall plate from dust, moisture, external impact, etc. In some cases, the sensor cover may hermetically seal the Hall plate. The substrate may comprise a plurality of electrical contacts 130-1, 130-2, and 130-3. The substrate may be assembled onto and electrically connected to a circuit board (e.g. FPC 118). A current I may be provided from a power supply 132 through the circuit board. The current I may pass through the Hall plate along the positive Y-axis, which results in electrons flowing in an opposite direction along the negative Y-axis. As shown in FIG. 5, a magnetic field B may be perpendicular to a top surface of the Hall plate in the negative Z-direction. The magnetic field B may be generated by the leakage flux extending from an edge surface of a rotor magnet. The Hall effect takes place as a result of the action of the Lorentz force on the charge carriers (electrons). It is a physical effect that arises in semiconductors or conductors carrying electric current in the presence of a magnetic field. A Hall voltage $V_H$ may be given by the following equation:

$V_H = -I \cdot B/(q \cdot n \cdot t)$ where I is the current flowing through the Hall plate, B is the magnetic field, q is the electron charge, n is the electron density, and t is the thickness of the Hall plate. As shown in the above equation, the Hall voltage $V_H$ is directly proportional to the current I and the magnetic field B, and inversely proportional to the electron charge q, electron density n and the thickness t. Accordingly, a higher output Hall voltage can be obtained by increasing the current through the Hall plate, by using a low-doped material, and/or by decreasing the thickness of the Hall plate.

As the rotor housing and rotor magnets rotate relative to the stator, the flux density of the leakage flux as measured by the Hall sensor changes, which results in a corresponding linear change in the Hall voltage. The change in the measured leakage flux density (and the change in the Hall voltage) can be used to determine the rotational position of the rotor, as described below with reference to FIGS. 6, 7, 8, and 9.

Figure 6:
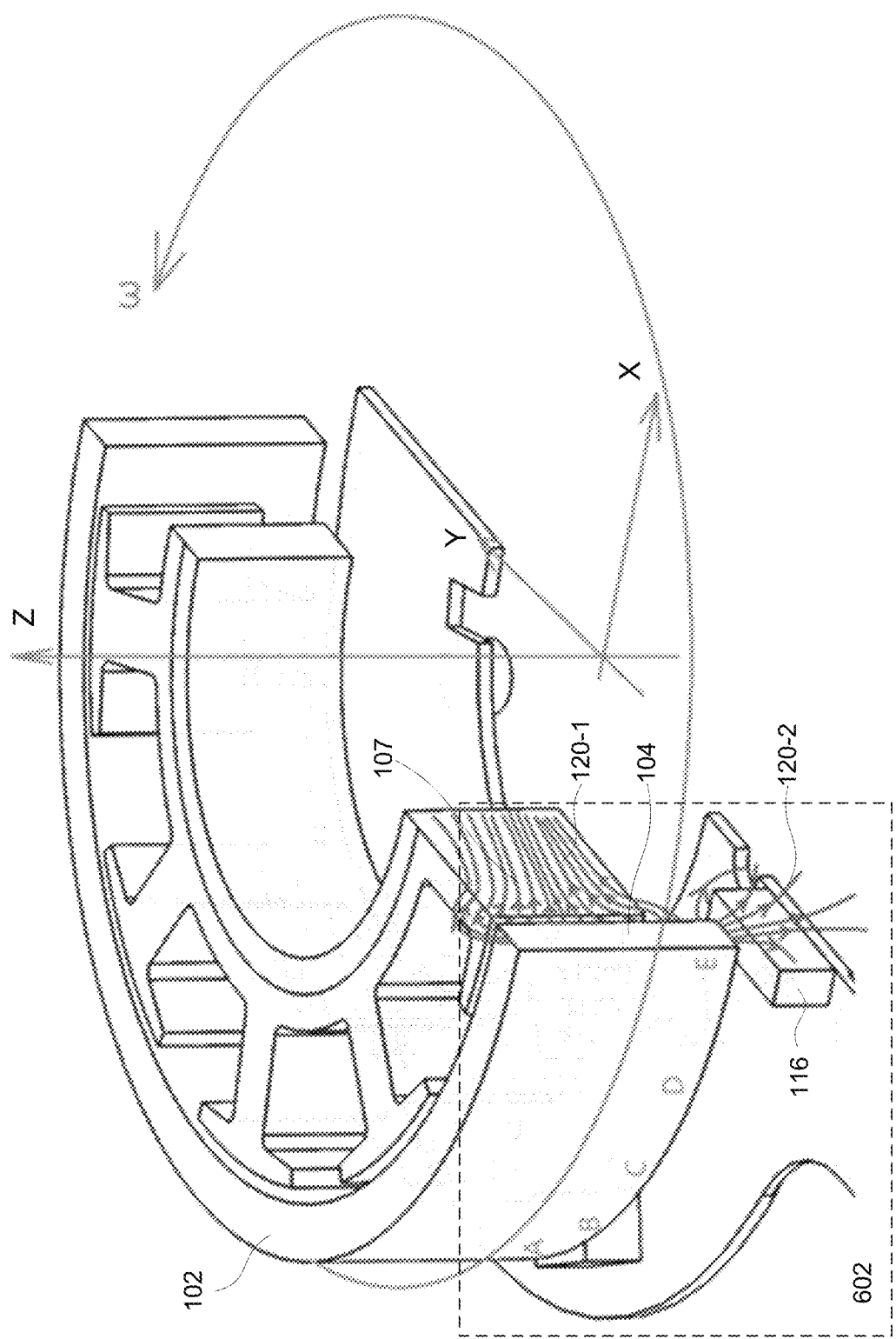
FIG. 6 is a perspective view of a cross-section of a brushless motor and further illustrates rotation of rotor magnet(s) above a position sensor, in accordance with some embodiments.

FIG. 6 is a perspective view of a cross-section of a brushless motor and further illustrates rotation of rotor magnet(s) above a position sensor, in accordance with some embodiments.

In FIG. 6, the rotor housing 102 may be configured to rotate relative to the stator 106 about a rotational axis (Z-axis). The rotor housing may include a plurality of rotor magnets 104 disposed on an interior portion of the rotor housing, such that the rotor magnets sequentially face a plurality of stator poles 107 as the rotor housing and rotor magnets rotate about the rotational axis. The rotor housing may rotate at an angular speed ω. The angular speed ω may be measured by one or more position sensors 116 (e.g. Hall effect sensors). Hall effect sensors can also be used to determine the position(s) of the pole(s) of the rotor magnet (s), and turn on or off the appropriate stator poles (winding coils) in a controlled manner to achieve brushless commutation. The speed and torque of the brushless motor may be determined by the strength of the electromagnetic field generated in the stator poles. By varying the current flow through the winding coils, the speed and torque of the brushless motor can be varied. One way to control the current flow is to control the (average) current flow through the coils. This can be accomplished by switching a supply voltage to the coils on and off, such that the relation between on and off times defines the average voltage over the coils and therefore the average current.

When the rotor housing rotates relative to the stator, different positions of the rotor housing sequentially pass above the position sensor. For example, in FIG. 6, the position sensor may be initially located directly under position E of the rotor housing. As the rotor housing rotates in a counter-clockwise direction about the Z-axis, positions D, C, B, and A of the rotor housing will sequentially pass above the position sensor. An edge surface of one or more rotor magnets (rotor poles) may be located at one or more positions A, B, C, D, and E of the rotor housing. Accordingly, as the rotor housing rotates relative to the stator, the edge surfaces of different rotor magnets may sequentially pass above the top surface of the position sensor. The position sensor may determine the rotor position (from the rotor housing position) by measuring the change in magnetic leakage flux, as described below with reference to FIGS. 7 and 8.

Figure 7:
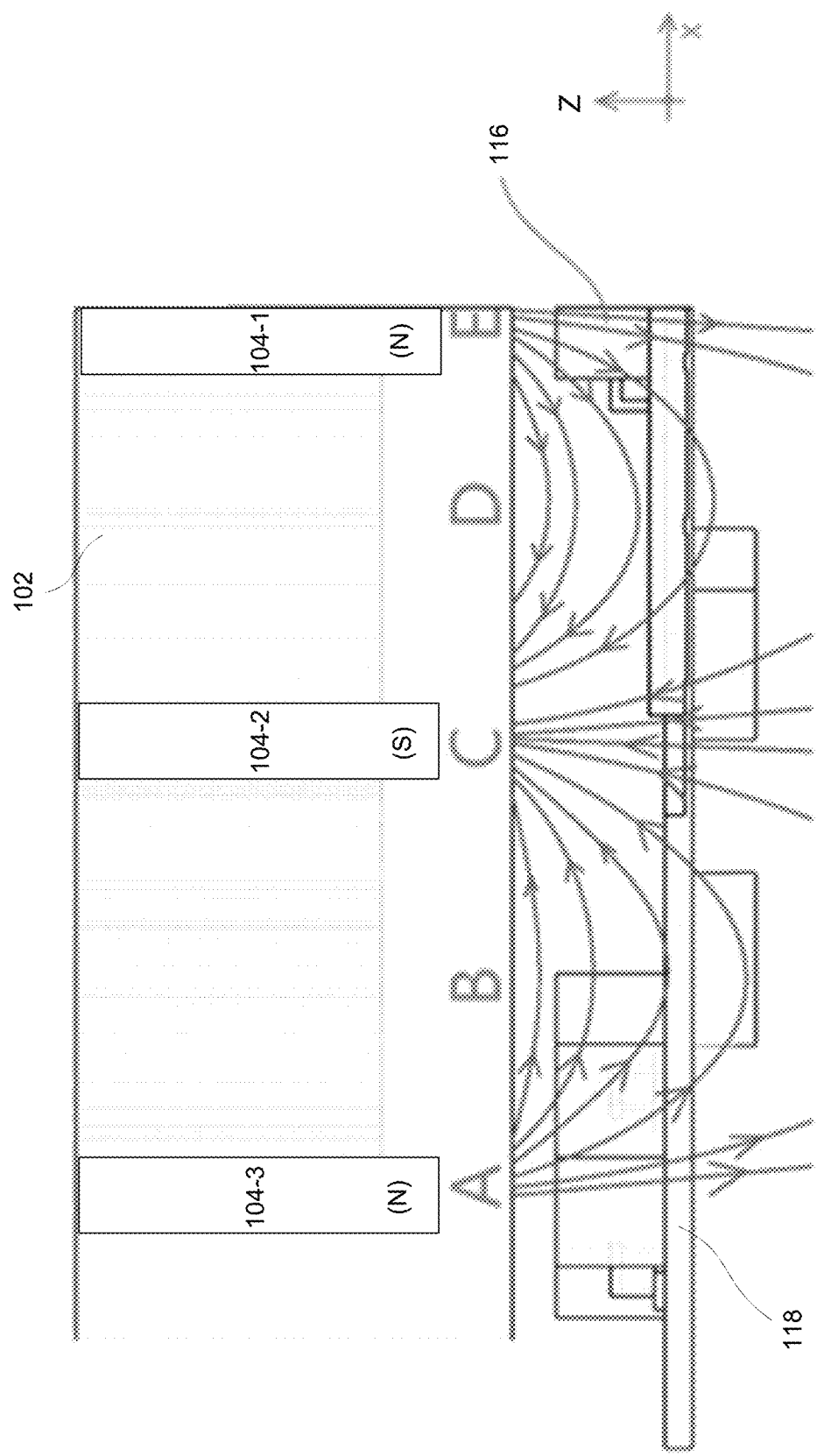
FIG. 7 is a side view of a cross-section of a brushless motor, and further illustrates the flow of leakage magnetic flux and its interaction with one or more position sensor(s), in accordance with some embodiments.

FIG. 7 is a cross-sectional view of a portion 602 of the brushless motor in FIG. 6, and illustrates the interaction of leakage magnetic flux with one or more position sensors, in accordance with some embodiments. As shown in FIG. 7, a plurality of rotor magnets 104 may be operably coupled to the rotor housing 102. The plurality of rotor magnets may be disposed in an alternating configuration (opposing poles) along the rotor housing. For example, a first rotor magnet 104-1 may correspond to a North rotor pole, a second rotor magnet 104-2 may correspond to a South rotor pole, and a third rotor magnet 104-3 may correspond to a North rotor pole. The first rotor magnet, second rotor magnet, and third rotor magnet may be located at positions E, C, and A of the rotor housing, respectively. Position B is located between positions A and C, and position D is located between positions C and E. There are no rotor magnets (and thus no rotor poles) present at positions B and D. The leakage magnetic flux generally flows in a direction from North rotor poles to South rotor poles underneath the edge surface of the rotor magnets. The leakage flux extends substantially in an axial direction (along the negative Z-axis) proximate to the North rotor poles (at positions E and A). Conversely, the leakage flux extends substantially in an axial direction (along the positive Z-axis) proximate to the South rotor pole (at position C). A position sensor 116 may be disposed directly below the edge of the rotor magnet at position E of the rotor housing. The position sensor may be a Hall effect sensor that generates an output voltage proportional to the density of the leakage flux. When the position sensor is directly below position E, the measured density of the leakage flux is highest since the leakage flux impinges orthogonally on the top surface of the position sensor (in a negative Z direction). The position sensor may generate a Hall voltage when the North rotor pole at position E passes above the sensor. The Hall voltage may be proportional to the density of the leakage flux. As the rotor housing rotates relative to the stator, the North rotor pole at position E starts to move away from the position sensor, which causes the density of the leakage flux (as measured by the sensor) to gradually decrease. When position D of the rotor housing passes above the position sensor, the measured density of the leakage flux may be negligible since the leakage flux lines at position D extend substantially parallel to the top surface of the position sensor. Accordingly, the Hall voltage may decrease to zero when position D of the rotor housing passes above the position sensor. As position D of the rotor housing moves away from the position sensor such that position C starts moving towards the sensor, the Hall voltage reverses due to the sensor's proximity to the South rotor pole at position C. When the position sensor is directly below position C of the rotor housing, the measured density of the leakage flux is highest since the leakage flux impinges orthogonally on the top surface of the sensor (in a positive Z direction). The Hall voltage at position C may be equal in magnitude, but opposite in polarity, to the Hall voltage at position E due to the opposite polarities of the respective rotor poles. As the South rotor pole at position C starts to move away from the position sensor, the density of the leakage flux (as measured by the sensor) gradually decreases. When position B of the rotor housing passes above the position sensor, the measured density of the leakage flux may be negligible since the leakage flux lines at position B extend substantially parallel to the top surface of the sensor. Accordingly, the Hall voltage may decrease to zero when position B of the rotor housing passes above the position sensor. As position B of the rotor housing moves away from the position sensor such that position A starts moving towards the sensor, the Hall voltage reverses again due to the sensor's proximity to the North rotor pole at position A. When the position sensor is directly below position A of the rotor housing, the measured density of the leakage flux is again highest since the leakage flux impinges orthogonally on the top surface of the sensor (in a negative Z direction). The Hall voltage at position A may have the same magnitude and polarity as the Hall voltage at position E, but different polarity from the Hall voltage at position C.

Figure 8:
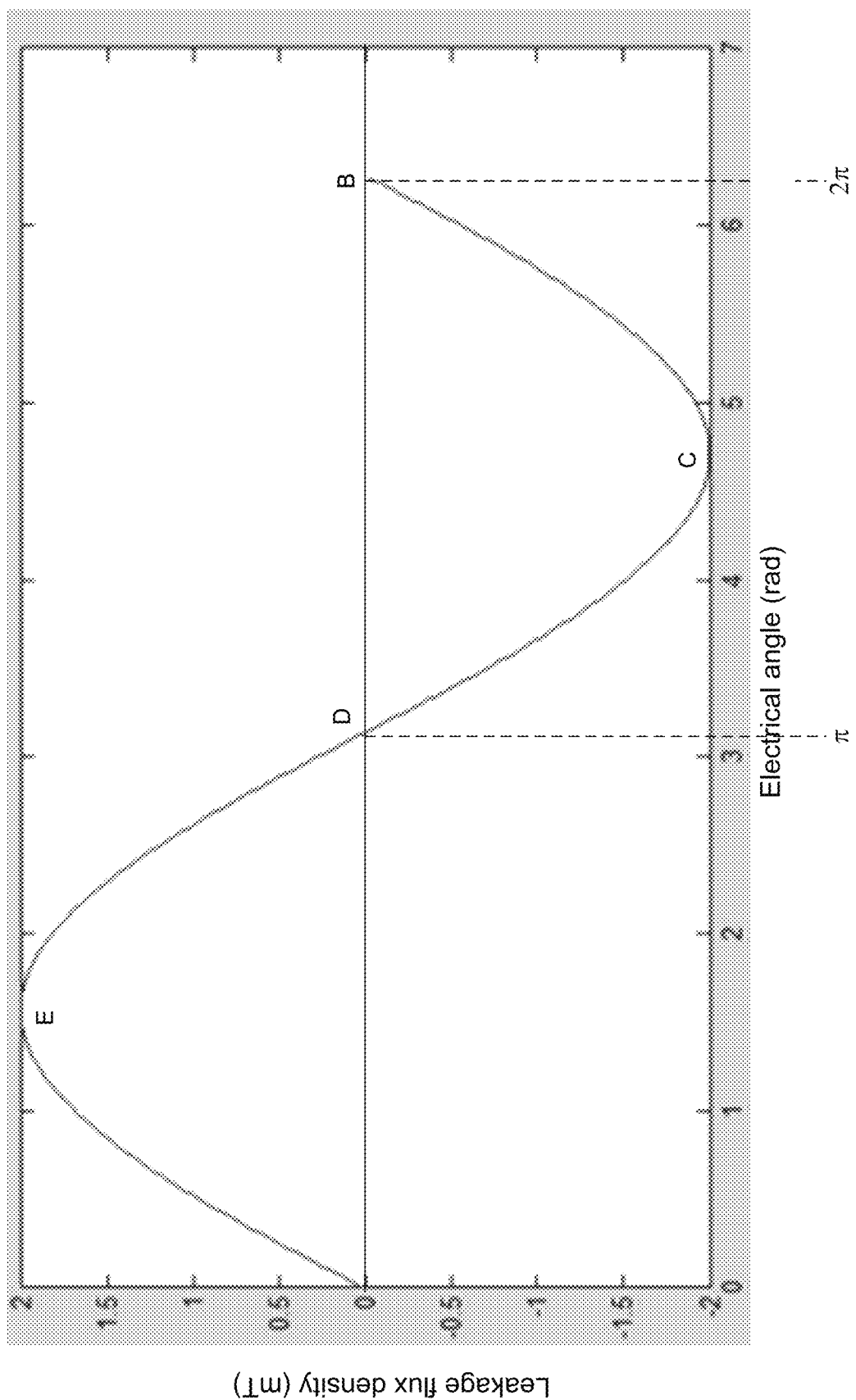
FIG. 8 is a graph of measured magnetic flux density as a function of electrical angle for a position sensor, in accordance with some embodiments.

FIG. 8 is a graph of measured leakage flux density as a function of electrical angle for a position sensor, in accordance with some embodiments. The electrical angle is a degree or cycle of electromotive force (EMF) induced in the position sensor. The leakage flux density may be measured using a position sensor, for example a Hall effect sensor. The positions E, D, C, and B in FIG. 8 may correspond to the positions E, D, C, and B of the rotor housing in FIG. 7. The measured leakage flux density may vary linearly with the Hall voltage, and may have a sinusoidal waveform. As shown in FIG. 8, the magnitude of the measured leakage flux density is highest at positions E and C. As previously mentioned, a North rotor pole is located directly above the position sensor when the sensor is directly below position E, and a South rotor pole is located directly above the sensor when the sensor is directly below position C. The measured leakage flux densities at positions E and C have opposite polarities due to the opposite polarities of the rotor poles at those positions. As the rotor magnets (and leakage flux) move relative to the stator poles, the electrical circuit of the Hall sensor is linked sequentially by the fluxes of the North and South rotor poles. Two flux reversals induce one cycle of voltage in the electrical circuit of the Hall sensor. The measured leakage flux densities at positions D and B are zero since the leakage flux lines at those positions extend substantially parallel to the top surface of the Hall sensor. As shown in FIG. 8, the positions E and C are flux reversals, and are spaced apart by 180 degrees ($\pi$ rads). Since the measured leakage flux density has a sinusoidal waveform, the positions D and B are also spaced apart by 180 degrees ($\pi$ rads).

In a brushless motor having only one pair of poles (North and South rotor poles), 360° of electrical cycle corresponds to 360° of mechanical rotation, and an angle measured in mechanical degrees has the same value in electrical degrees. However, in brushless motors with more than two poles, one electrical cycle is generated per pair of poles per revolution. For example, an eight-pole brushless motor (having four pairs of rotor poles) generates four cycles of voltage in each armature coil per revolution. Accordingly, for an eight-pole brushless motor, each mechanical degree is equivalent to four electrical degrees. The relationship between electrical angle/degree and mechanical angle/degree is given as follows:

Number of electrical degrees in a given angle=$p/2$*Number of mechanical degrees in that angle, where p is the number of magnetic poles of either the rotor or the stator.

For the out-runner type brushless motor configurations shown in FIG. 7, p corresponds to the number of rotor poles.

In the embodiment of FIG. 7, the brushless motor may have four pairs of rotor poles (i.e., eight poles). The sinusoidal waveform in FIG. 8 provides information about the measured leakage flux density as a function of the electrical angle. However, a single sinusoidal waveform (using only one Hall sensor) is insufficient to provide information about a rotational angle of the motor when the motor has more than two rotor poles, because flux reversal may occur in any direction between any of the rotor poles.

To determine the rotational angle for a brushless motor having more than two rotor poles (e.g., eight rotor poles), a plurality of position sensors (e.g., Hall effect sensors) may be used. For example, a first sensor may be located below position E of the rotor housing, and a second sensor may be located below position B of the rotor housing, such that the two position sensors are out of phase with each other. The distance and/or angle between positions B and E can be predetermined (or known). For example, positions B and E may be configured to be spaced apart by m mechanical degrees. The first and second position sensors may be spaced apart by $\phi$ electrical degrees. $\phi$ may be any angle that is not equal to $\pi.n$, where n is an integer (0, 1, 2, ...). It is noted that if the first and second position sensors are spaced apart by $\pi.n$, the signals from the two sensors would be in-phase, which may not allow the rotational angle to be determined.

Figure 9:
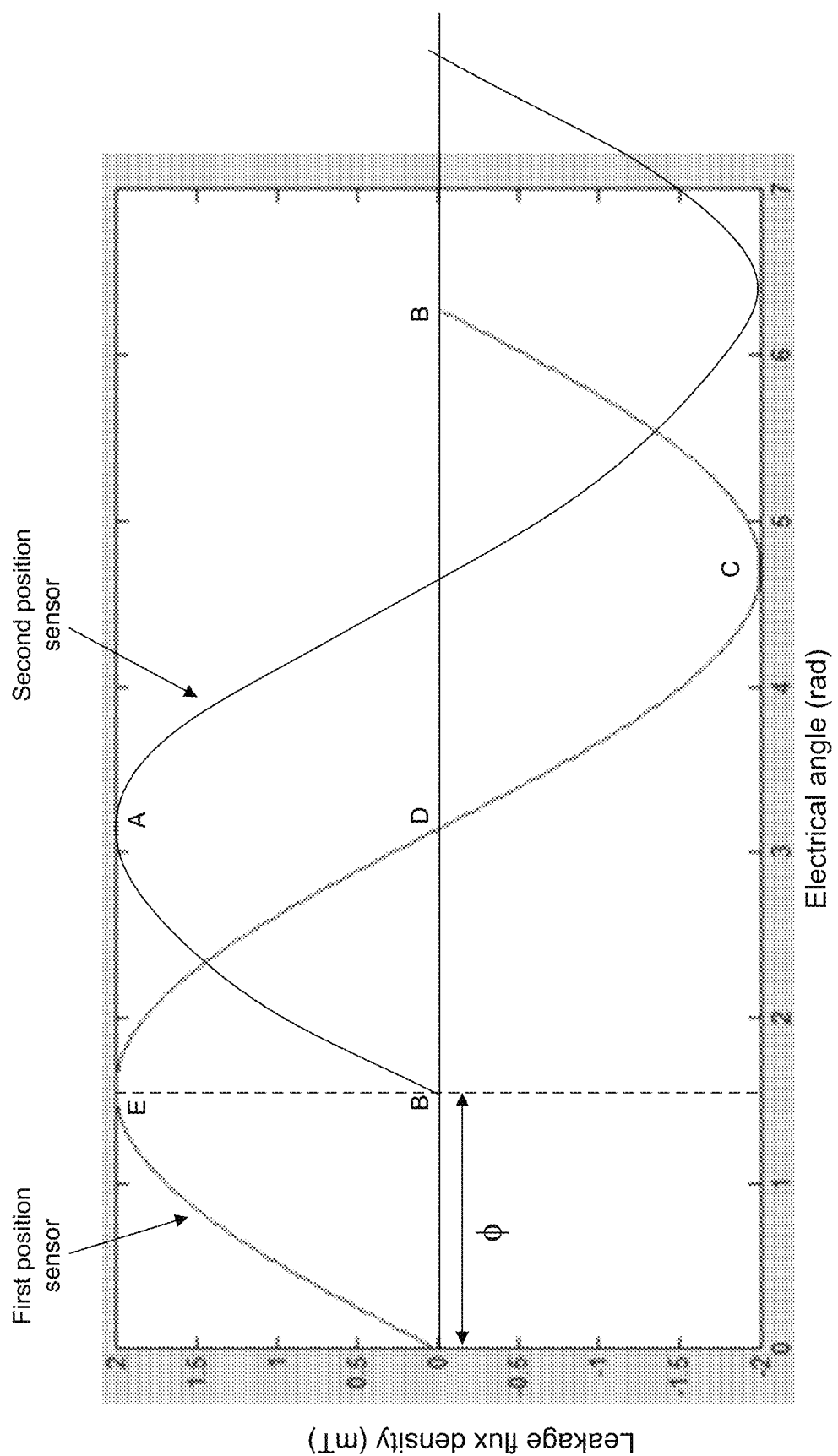
FIG. 9 is a graph of measured magnetic flux density as a function of electrical angle for two out-of-phase position sensors, in accordance with some embodiments.

The rotational angle of the motor can be determined based on a phase difference between the measured leakage flux densities (sinusoidal waveforms) for the first position sensor and the second position sensor, as shown in FIG. 9. Specifically, FIG. 9 is a graph of measured magnetic flux densities as a function of electrical angle for two position sensors that are out of phase with each other, in accordance with some embodiments.

In FIG. 9, a first sinusoidal waveform is associated with the first position sensor, and a second sinusoidal waveform is associated with the second position sensor. The sinusoidal waveforms are illustrative of the measured magnetic flux densities as a function of electrical angle for the first and second position sensors. The second sensor is located at position B of the rotor housing when the first sensor is located at position E. At those positions, the North rotor pole is located directly above the first position sensor, and there is no rotor pole above the second position sensor. Accordingly, the first position sensor measures a maximum (positive) leakage flux density, whereas the second sensor measures negligible leakage flux density. As the rotor housing rotates relative to the stator, position D of the rotor housing passes above the first position sensor, and position A of the rotor housing passes above the second position sensor. At those positions, there is no rotor pole above the first position sensor, and another North rotor pole is now located directly above the second position sensor. Accordingly, the first position sensor measures negligible leakage flux density, whereas the second sensor measures a maximum (positive) leakage flux density. A phase difference (phase displacement angle) between the first sinusoidal waveform and the second sinusoidal waveform may be denoted by $\phi$. In FIG. 9, the phase difference $\phi$ may correspond to $\pi/2$ rads (90 electrical degrees). In some embodiments, the phase difference $\phi$ may be less than $\pi/2$ or greater than $\pi/2$. The phase difference $\phi$ may not be equal to $\pi.n$, where n is an integer (0, 1, 2, ...). As previously mentioned, the distance and/or angle between positions B and E can be predetermined (or known). Accordingly, the rotational angle (or amount of rotation) of the rotor housing can be calculated based on: (1) the phase difference $\phi$, and (2) the predetermined (or known) distance and/or angle between positions B and E.

The sine/cosine signal outputs from the first position sensor and the second position sensor can be directly used to decode the rotor position. A two-phase type phase-lock-loop (TP-PLL) may be used to normalize the Hall sensor sine/cosine signals. The normalized sine/cosine signals may be subsequently transformed into 3-phase synchronous sinusoidal voltage waveforms as the inputs to pulse-width-modulation (PWM). The amplitude of the 3-phase sine waves may be normalized with a fixed voltage level. The amplitude of the PWM carrier signal may be made adjustable to control the PWM average output in order to limit the phase peak current, peak output torque, and peak speed. The 3-phase PWM output logic signals may be fed into a 3-phase inverter that provides power amplification.

In some embodiments, a plurality of position sensors may be provided. The plurality of position sensors may be of a same type or different types. In some embodiments, the plurality of position sensors may comprise at least two horizontal-type linear Hall effect sensors. The position sensors may be arranged to measure leakage magnetic flux as the rotor housing rotates relative to the stator. For example, in some embodiments, the plurality of position sensors may comprise a first position sensor and a second position sensor spaced apart by an angle θ electrical degrees relative to the rotational axis of the rotor. The angle θ may range from about 45 degrees to about 135 degrees. In some embodiments, the angle θ may be greater than about 0 degrees and less than about 180 degrees. Alternatively, the angle θ may be greater than about 180 degrees and less than about 360 degrees. In some embodiments, the first position sensor and the second position sensor may be of a same type. For example, both the first position sensor and the second position sensor may be horizontal-type linear Hall effect sensors. The top surfaces of the first position sensor and the second position sensor may be configured to lie on a same horizontal plane, such that the top surfaces are at a same height level. Alternatively, the first position sensor and the second position sensor may be of different types. In those alternative embodiments, the top surfaces of the first position sensor and the second position sensor may be configured to lie on different planes, such that the top surfaces are at a different height levels.

In some further embodiments, the rotational angle of the rotor may be determined using only one position sensor. This may be achieved, for example, by limiting the rotor magnet to provide only one pair of rotor poles, such that the electrical angle is equal to the mechanical angle. Alternatively, a known mechanical limit may be used, whereby the brushless motor is powered on and rotated to the mechanical limit to record an electrical angle. The electrical angle may be associated with the mechanical degree of rotation. Accordingly, the rotational angle of the rotor may then be determined using for example the graph in FIG. 8.

In some embodiments, a method for determining the rotational position of the rotor in a brushless motor may be provided. The brushless motor may correspond, for example, to the brushless motor previously described in FIGS. 1 through 9. The method may comprise measuring a leakage flux using at least one position sensor as the rotor rotates relative to a stator, and determining the rotational position of the rotor based on the measured leakage flux. A magnet associated with the rotor (e.g., a rotor magnet) may be configured to generate a main flux and the leakage flux. The main flux may be configured to extend in a first direction (e.g., radial direction) towards the stator, and the leakage flux may be configured to extend in a second direction (e.g., axial direction) towards the sensor. The first direction may lie on a radial plane, and the second direction may lie outside of the radial plane. The rotational position of the rotor need not be based on a measure of the main flux. The method may also further comprise controlling actuation of the motor based on the determined rotational position of the rotor.

Brushless motor commutation relies on feedback of the rotational position of the rotor to determine a timing for energizing the stator poles/coils to generate a desired speed and torque. One or more rotor magnets may be mounted onto the rotor housing. One or more position sensors may be mounted beneath an edge surface of one or more rotor magnets. The position sensor(s) may be configured to output a Hall voltage that is proportional to the leakage flux density. For example, the position sensor may generate a HIGH voltage when a North rotor pole passes above the sensor, and generate a LOW voltage when a South rotor pole passes above the sensor. A first set of switches may be turned on when the Hall sensor output is a HIGH voltage. At this stage, armature current may flow through the stator windings to alternately induce the stator electromagnetic poles. The magnetic force generated by the rotor magnetic field (main flux) and stator electromagnetic field causes the rotor to rotate. After the rotor signal reaches 180° (π rads), the Hall voltage reverses in polarity due to its proximity to a South rotor pole. A second set of switches may be turned on with current being applied in a reverse direction, such that the opposite stator electromagnetic poles induce the rotor to continue rotating in the same direction. The above steps may be repeated to drive the brushless motor in a same or in different directions, at a same or different speeds, and/or with a same or different torques. The speed and/or torque of the motor may be modified by adjusting the switching frequency and magnitude of the current through the stator windings.

The brushless motor of the present disclosure may be used in various applications. For example, in some embodiments, an apparatus for stabilizing a device may be provided. The apparatus may be a stabilizing platform. The device may be a payload device. The payload devices may include imaging devices (including but not limited to video camera or camera) and non-imaging devices (including but not limited to microphone, sample collector). The apparatus may comprise a frame assembly adapted to hold the device and a brushless motor coupled to the frame assembly. The brushless motor may include one or more of the brushless motors as described elsewhere herein. The brushless motor may be configured to directly drive the frame assembly in response to one or more motor signals so as to allow the device to rotate around at least one of a pitch, roll, and yaw axes of the device.

The apparatus may be used in the fields of videography, photography and/or surveillance. A carrier may be used to carry the device. The device may be a payload device such as an imaging device. The carrier may comprise the frame assembly and one or more brushless motors for actuating the frame assembly. The carrier may be mounted onto a movable object. When the movable object is in motion, the carrier may be subject to movement such as high-frequency vibration and/or low-frequency shake, causing similar movement of the payload device and affecting operation of the payload device. When the payload device is an imaging device, sudden or abrupt movements of the carrier may translate to poor-quality images acquired by the imaging device. The apparatus may be a stabilizing platform, such as a camera mount or a gimbal mount. The apparatus may be used to support and provide stability to the payload device. For example, the apparatus can detect posture changes in the payload device, and reverse compensate the detected posture changes by using one or more brushless motors that have one or more position sensors.

The frame assembly may be actuated using one or more brushless motors. Accurate sensing of the rotor positions in the brushless motors may be achieved using one or more of the position sensors described elsewhere herein. A posture or orientation of the frame assembly (in one or more degrees of freedom) can be controlled by actuating the brushless motors based on the sensed rotor positions. In some embodiments, the frame assembly may be a gimbal mount having two or more interconnected joints. The posture of the gimbal mount may be controlled by adjusting an angle between adjacently connected joints ("joint angle") using one or more brushless motors. A direction of a magnetic field generated within the brushless motor can be controlled to output an electrical degree of the brushless motor. The joint angle can be adjusted by adjusting the electrical degree (or magnetic field) of the brushless motor.

Figure 10:
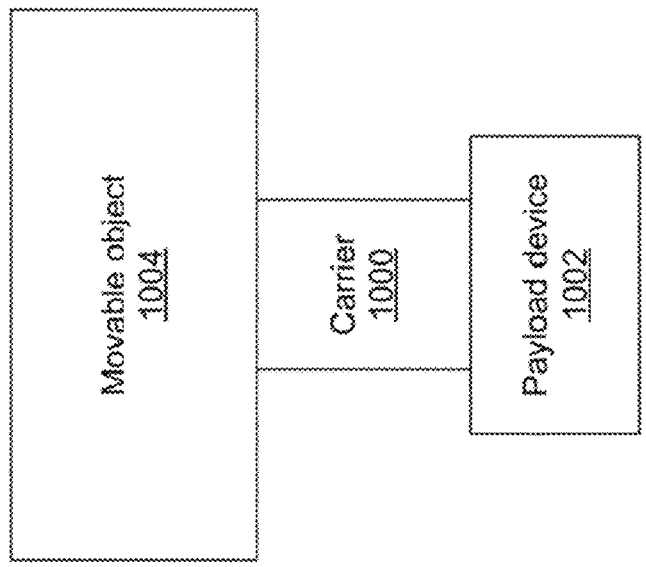
FIG. 10 is a block diagram of a system comprising one or more exemplary brushless motors, in accordance with some embodiments.

FIG. 10 is a block diagram of a system comprising one or more exemplary brushless motors, in accordance with some embodiments.

A carrier 1000 may be configured to hold a payload device 1002. The carrier may be configured to be mounted or otherwise coupled to a movable object 1004. The movable object may be a motorized or non-motorized vehicle or vessel, robot, human, animal, or the like. In some embodiments, the carrier may be mounted to a manned or unmanned vehicle. In some cases, the vehicle may be an unmanned aerial vehicle (UAV). Any description herein of a UAV may apply to any type of movable object and vice versa.

Examples of payload devices may include a device that collects data (e.g., imaging device (for visible light, infrared, ultra-violet (UV), geo-thermal or any other type of emission); a device that detects one or more particles; a device that detects a field such as a magnetic field, electric field, radio field; radiation detector; microphone, any type of sensor as described in greater detail elsewhere herein), a device that provides an emission (e.g., light emitter, image emitter, heat emitter, radio emitter, wireless signal emitter particle emitter), a device that interacts with the environment (e.g., robotic arm, sample collector, liquid distributer, pesticide or fertilizer sprayer), or any other type of device or combinations thereof. A payload device can also include one or more sensors for surveying one or more targets. Any suitable sensor can be incorporated into the payload, such as an image capture device (e.g., a camera), an audio capture device (e.g., a parabolic microphone), an infrared imaging device, or an ultraviolet (UV) imaging device. The sensor can provide static sensing data (e.g., a photograph) or dynamic sensing data (e.g., a video). In some embodiments, the sensor provides sensing data for the target of the payload device. Alternatively or in combination, the payload device can include one or more emitters for providing signals to one or more targets. Any suitable emitter can be used, such as an illumination source or a sound source. In some embodiments, the payload device can include one or more transceivers, such as for communication with a module remote from the movable object. Optionally, the payload device can be configured to interact with the environment or a target. For example, the payload device can include a tool, instrument, or mechanism capable of manipulating objects, such as a robotic arm.

In some embodiments, the payload device may include an imaging device configured to acquire and/or transmit one or more images of objects within the imaging device's field of view. Examples of an imaging device may include a camera, a video camera, smartphone/cell phone with a camera, or any device having the ability to capture optical signals. A non-imaging device may include any other devices such as for collecting or distributing sound, particles, liquid, or the like. Examples of non-imaging devices may include a microphone, a loud speaker, a particle or radiation detector, a fire hose, and the like.

The payload device may be supported by the carrier. The carrier can be provided for the payload device and the payload device can be coupled to the movable object via the carrier, either directly (e.g., directly contacting the movable object) or indirectly (e.g., not contacting the movable object). In some embodiments, the payload device can be integrally formed with the carrier. Alternatively, the payload device can be releasably coupled to the carrier. In some embodiments, the payload device can include one or more payload elements, and one or more of the payload elements can be movable relative to the movable object and/or the carrier.

The carrier can provide support to the payload device (e.g., carry at least part of the weight of the payload device). The carrier can include a suitable mounting structure (e.g., a stabilizing gimbal platform) capable of stabilizing and/or directing the movement of the payload device. In some embodiments, the carrier can be configured to control the state of the payload device (e.g., position and/or orientation) relative to the movable object. For example, the carrier can be configured to move relative to the movable object (e.g., with respect to one, two, or three degrees of translation and/or one, two, or three degrees of rotation) such that the payload device maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, or a payload target object).

In some embodiments, the carrier can be configured to permit movement of the payload device relative to the carrier and/or the movable object. The movement can be a translation with respect to up to three degrees of freedom (e.g., along one, two, or three axes) or a rotation with respect to up to three degrees of freedom (e.g., about one, two, or three axes), or any suitable combination thereof.

The carrier may comprise a frame configured to hold the payload device, a motor assembly, and a controller assembly.

The frame assembly may comprise a payload support structure for carrying one or more payload devices, and one or more carrier components for connecting the payload support structure to a movable object. In some instances, the frame assembly may be connected to a base of a movable object. The movable object may be a vehicle (e.g., an aircraft, vehicle, ship, robot or a human). The base may be rigidly affixed to the movable object. In some cases, the base may form part of a housing of the movable object. In some embodiments, N number of carrier components may be connected serially between the base and the payload support structure, such that the payload support structure is configurable to move in N degrees of freedom relative to the base, where N is an integer greater than or equal to one. When an attitude of the movable object changes, the motion of one or more of the carrier components may be coordinated using one or more motors (e.g., direct drive motors) to ensure that an attitude of the payload support structure remains in a relatively stable configuration (for optimal operation of the payload device), regardless of changing attitudes of the movable object. Such stabilization platforms may provide stability to the payload device by detecting posture changes in the payload device and reverse compensating the detected posture changes.

The motor assembly may comprise one or more brushless motors as described elsewhere herein. The motor assembly may be configured to directly drive the frame assembly, causing the payload support structure supporting the payload device to rotate around one or more rotational axes. The use of brushless motors may offer reduced energy consumption while allowing stepless control of the motor speed. Furthermore, using brushless motors, the response time can be reduced between the posture change of the movable object and the corresponding compensating change to the stabilizing platform due to faster response time of the electric motors. Thus, the pointing direction of the payload device may be quickly adjusted (e.g., to point at a moving target). In some cases, a predetermined position or posture of the payload device may be maintained. Further, the payload device may be stabilized against unwanted movement such as vibrations or shakes caused by the movable object or other external factors. In cases where the payload device is an imaging device, the quality of images acquired by the payload device can be improved.

The controller assembly may include a sensing system configured to detect or obtain state information associated with the payload device. The state information may include velocity, orientation, attitude, gravitational forces, acceleration, position, and/or any other physical state experienced by the payload device. For example, the state information may include an angular and/or linear position, velocity and/or acceleration, (which may include an orientation or inclination of the payload device). In some embodiments, the sensing system may include an inertial measurement member comprising one or more gyroscopes, velocity sensors, accelerometers, magnetometers, and the like. In other embodiments, other types of state-detecting sensors may be used instead of or in addition to the inertial measurement member.

The controller assembly may also include a controller for calculating posture information associated with the payload device based on the state information obtained by the sensing system. For example, detected angular velocity and/or linear acceleration of the payload device may be used to calculate the attitude of the payload device with respect a pitch, roll and/or yaw axis of the payload device.

Based on the calculated posture of the payload device, one or more motor signals may be generated to control the motor assembly. The motor assembly may be configured to directly drive the frame assembly to rotate around at least one or a pitch, roll or yaw axis of the payload device so as to adjust the posture of the payload device (e.g., the shooting angle of an imaging device). The motor assembly can comprise one or more brushless motors that are respectively coupled to one or more rotational axis (e.g., pitch, roll or yaw) of the payload device. In some embodiments, one or more of the rotational axes (e.g., pitch, roll and yaw) may intersect with the payload device.

In some embodiments, the rotation order of the payload device is selected to allow the payload device to be rotated without the problem of "gimbal lock" under ordinary operational circumstances for the payload device, such as when pointing straight down. For example, in one embodiment, the rotation order may be pitch, roll and yaw from the innermost to outermost rotational axis. In another embodiment, the rotation order may be pitch, roll and yaw from the outermost to the innermost rotational axis. Any rotation order (e.g., pitch/yaw/roll, roll/pitch/yaw, roll/yaw/pitch, yaw/roll/pitch, or yaw/pitch/roll from outermost to the innermost rotational axis, or from innermost to outermost rotational axis) of the payload device may be contemplated.

The systems, devices, and methods described herein can be applied to a wide variety of movable objects. As previously mentioned, any description herein of an aerial vehicle may apply to and be used for any movable object. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: $1 \text{ cm}^3$, $2 \text{ cm}^3$, $5 \text{ cm}^3$, $10 \text{ cm}^3$, $20 \text{ cm}^3$, $30 \text{ cm}^3$, $40 \text{ cm}^3$, $50 \text{ cm}^3$, $60 \text{ cm}^3$, $70 \text{ cm}^3$, $80 \text{ cm}^3$, $90 \text{ cm}^3$, $100 \text{ cm}^3$, $150 \text{ cm}^3$, $200 \text{ cm}^3$, $300 \text{ cm}^3$, $500 \text{ cm}^3$, $750 \text{ cm}^3$, $1000 \text{ cm}^3$, $5000 \text{ cm}^3$, $10,000 \text{ cm}^3$, $100,000 \text{ cm}^3$, $1 \text{ m}^3$, or $10 \text{ m}^3$. Conversely, the total volume of the movable object may be greater than or equal to about: $1 \text{ cm}^3$, $2 \text{ cm}^3$, $5 \text{ cm}^3$, $10 \text{ cm}^3$, $20 \text{ cm}^3$, $30 \text{ cm}^3$, $40 \text{ cm}^3$, $50 \text{ cm}^3$, $60 \text{ cm}^3$, $70 \text{ cm}^3$, $80 \text{ cm}^3$, $90 \text{ cm}^3$, $100 \text{ cm}^3$, $150 \text{ cm}^3$, $200 \text{ cm}^3$, $300 \text{ cm}^3$, $500 \text{ cm}^3$, $750 \text{ cm}^3$, $1000 \text{ cm}^3$, $5000 \text{ cm}^3$, $10,000 \text{ cm}^3$, $100,000 \text{ cm}^3$, $1 \text{ m}^3$, or $10 \text{ m}^3$.

In some embodiments, the movable object may have a footprint (which may refer to the lateral cross-sectional area encompassed by the movable object) less than or equal to about: $32,000 \text{ cm}^2$, $20,000 \text{ cm}^2$, $10,000 \text{ cm}^2$, $1,000 \text{ cm}^2$, $500 \text{ cm}^2$, $100 \text{ cm}^2$, $50 \text{ cm}^2$, $10 \text{ cm}^2$, or $5 \text{ cm}^2$. Conversely, the footprint may be greater than or equal to about: $32,000 \text{ cm}^2$, $20,000 \text{ cm}^2$, $10,000 \text{ cm}^2$, $1,000 \text{ cm}^2$, $500 \text{ cm}^2$, $100 \text{ cm}^2$, $50 \text{ cm}^2$, $10 \text{ cm}^2$, or $5 \text{ cm}^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

In some embodiments, a UAV can include a propulsion system having a plurality of rotors. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length. For example, the length can be less than or equal to 2 m, or less than equal to 5 m. In some embodiments, the length can be within a range from 40 cm to 1 m, from 10 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for an movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 11:
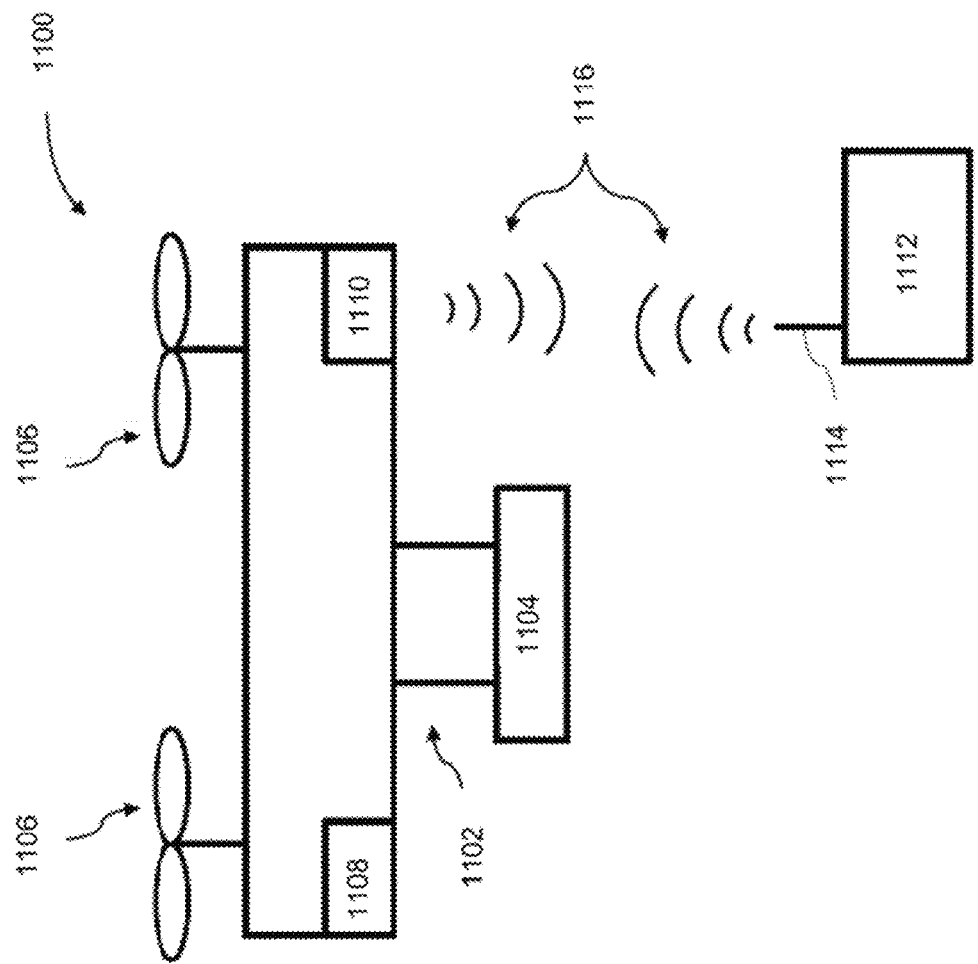
FIG. 11 is a block diagram of a system for controlling a movable object, in accordance with some embodiments.

FIG. 11 illustrates a movable object 1100 including a carrier 1102 and a payload 1104, in accordance with embodiments. Although the movable object 1100 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1104 may be provided on the movable object 1100 without requiring the carrier 1102. The movable object 1100 may include propulsion mechanisms 1106, a sensing system 1108, and a communication system 1110.

The propulsion mechanisms 1106 can include one or more of rotors, propellers, blades, engines, motors, wheels, axles, magnets, or nozzles, as previously described. For example, the propulsion mechanisms 1106 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1106 can be mounted on the movable object 1100 using any suitable means, such as a support element (e.g., a drive shaft) as described elsewhere herein. The propulsion mechanisms 1106 can be mounted on any suitable portion of the movable object 1100, such on the top, bottom, front, back, sides, or suitable combinations thereof.

In some embodiments, the propulsion mechanisms 1106 can enable the movable object 1100 to take off vertically from a surface or land vertically on a surface without requiring any horizontal movement of the movable object 1100 (e.g., without traveling down a runway). Optionally, the propulsion mechanisms 1106 can be operable to permit the movable object 1100 to hover in the air at a specified position and/or orientation. One or more of the propulsion mechanisms 1100 may be controlled independently of the other propulsion mechanisms. Alternatively, the propulsion mechanisms 1100 can be configured to be controlled simultaneously. For example, the movable object 1100 can have multiple horizontally oriented rotors that can provide lift and/or thrust to the movable object. The multiple horizontally oriented rotors can be actuated to provide vertical takeoff, vertical landing, and hovering capabilities to the movable object 1100. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1100 (e.g., with respect to up to three degrees of translation and up to three degrees of rotation).

The sensing system 1108 can include one or more sensors that may sense the spatial disposition, velocity, and/or acceleration of the movable object 1100 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1108 can be used to control the spatial disposition, velocity, and/or orientation of the movable object 1100 (e.g., using a suitable processing unit and/or control module, as described below). Alternatively, the sensing system 1108 can be used to provide data regarding the environment surrounding the movable object, such as weather conditions, proximity to potential obstacles, location of geographical features, location of manmade structures, and the like.

The communication system 1110 enables communication with terminal 1112 having a communication system 1114 via wireless signals 1116. The communication systems 1110, 1114 may include any number of transmitters, receivers, and/or transceivers suitable for wireless communication. The communication may be one-way communication, such that data can be transmitted in only one direction. For example, one-way communication may involve only the movable object 1100 transmitting data to the terminal 1112, or vice-versa. The data may be transmitted from one or more transmitters of the communication system 1110 to one or more receivers of the communication system 1112, or vice-versa. Alternatively, the communication may be two-way communication, such that data can be transmitted in both directions between the movable object 1100 and the terminal 1112. The two-way communication can involve transmitting data from one or more transmitters of the communication system 1110 to one or more receivers of the communication system 1114, and vice-versa.

In some embodiments, the terminal 1112 can provide control data to one or more of the movable object 1100, carrier 1102, and payload 1104 and receive information from one or more of the movable object 1100, carrier 1102, and payload 1104 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1106), or a movement of the payload with respect to the movable object (e.g., via control of the carrier 1102). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1108 or of the payload 1104). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1112 can be configured to control a state of one or more of the movable object 1100, carrier 1102, or payload 1104. Alternatively or in combination, the carrier 1102 and payload 1104 can also each include a communication module configured to communicate with terminal 1112, such that the terminal can communicate with and control each of the movable object 1100, carrier 1102, and payload 1104 independently.

In some embodiments, the movable object 1100 can be configured to communicate with another remote device in addition to the terminal 1112, or instead of the terminal 1112. The terminal 1112 may also be configured to communicate with another remote device as well as the movable object 1100. For example, the movable object 1100 and/or terminal 1112 may communicate with another movable object, or a carrier or payload of another movable object.

When desired, the remote device may be a second terminal or other computing device (e.g., computer, laptop, tablet, smartphone, or other mobile device). The remote device can be configured to transmit data to the movable object 1100, receive data from the movable object 1100, transmit data to the terminal 1112, and/or receive data from the terminal 1112. Optionally, the remote device can be connected to the Internet or other telecommunications network, such that data received from the movable object 1100 and/or terminal 1112 can be uploaded to a website or server.

In some embodiments, a system for controlling a movable object may be provided in accordance with embodiments. The system can be used in combination with any suitable embodiment of the systems, devices, and methods disclosed herein. The system can include a sensing module, processing unit, non-transitory computer readable medium, control module, and communication module.

The sensing module can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module can be operatively coupled to a processing unit having a plurality of processors. In some embodiments, the sensing module can be operatively coupled to a transmission module (e.g., a Wi-Fi image transmission module) configured to directly transmit sensing data to a suitable external device or system. For example, the transmission module can be used to transmit images captured by a camera of the sensing module to a remote terminal.

The processing unit can have one or more processors, such as a programmable processor (e.g., a central processing unit (CPU)). The processing unit can be operatively coupled to a non-transitory computer readable medium. The non-transitory computer readable medium can store logic, code, and/or program instructions executable by the processing unit for performing one or more steps. The non-transitory computer readable medium can include one or more memory units (e.g., removable media or external storage such as an SD card or random access memory (RAM)). In some embodiments, data from the sensing module can be directly conveyed to and stored within the memory units of the non-transitory computer readable medium. The memory units of the non-transitory computer readable medium can store logic, code and/or program instructions executable by the processing unit to perform any suitable embodiment of the methods described herein. For example, the processing unit can be configured to execute instructions causing one or more processors of the processing unit to analyze sensing data produced by the sensing module. The memory units can store sensing data from the sensing module to be processed by the processing unit. In some embodiments, the memory units of the non-transitory computer readable medium can be used to store the processing results produced by the processing unit.

In some embodiments, the processing unit can be operatively coupled to a control module configured to control a state of the movable object. For example, the control module can be configured to control the propulsion mechanisms of the movable object to adjust the spatial disposition, velocity, and/or acceleration of the movable object with respect to six degrees of freedom. Alternatively or in combination, the control module can control one or more of a state of a carrier, payload, or sensing module.

The processing unit can be operatively coupled to a communication module configured to transmit and/or receive data from one or more external devices (e.g., a terminal, display device, or other remote controller). Any suitable means of communication can be used, such as wired communication or wireless communication. For example, the communication module can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module can transmit and/or receive one or more of sensing data from the sensing module, processing results produced by the processing unit, predetermined control data, user commands from a terminal or remote controller, and the like.

The components of the system can be arranged in any suitable configuration. For example, one or more of the components of the system can be located on the movable object, carrier, payload, terminal, sensing system, or an additional external device in communication with one or more of the above. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system can occur at one or more of the aforementioned locations.

As used herein A and/or B encompasses one or more of A or B, and combinations thereof such as A and B. It will be understood that although the terms "first," "second," "third" etc. may be used herein to describe various elements, components, regions and/or sections, these elements, components, regions and/or sections should not be limited by these terms. These terms are merely used to distinguish one element, component, region or section from another element, component, region or section. Thus, a first element, component, region or section discussed below could be termed a second element, component, region or section without departing from the teachings of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the figures. It will be understood that relative terms are intended to encompass different orientations of the elements in addition to the orientation depicted in the figures. For example, if the element in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the element in one of the figures were turned over, elements described as "below" or "beneath" other elements would then be oriented "above" the other elements. The exemplary terms "below" or "beneath" can, therefore, encompass both an orientation of above and below.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. A motor comprising:
a rotor housing;
a plurality of rotor magnets spaced apart from each other by a spacing and operably coupled to the rotor housing, each of the rotor magnets corresponding to a rotor pole that provides a magnetic flux comprising a main flux and a leakage flux;
a stator disposed within the rotor housing, the stator comprising a plurality of stator poles, and the main flux being configured to extend in a first direction towards at least one of the stator poles; and
a plurality of sensors configured to measure the leakage flux generated by each of the plurality of rotor magnets as the rotor housing rotates relative to the stator, the leakage flux being configured to extend in a second direction towards the plurality of sensors;
wherein:
the first direction lies on a radial plane and the second direction lies out of the radial plane;
each of the plurality of rotor magnets is magnetized in a radial direction with an inner side being one of a north pole and a south pole and an outer side being another one of the north pole and the south pole, the inner side of each of the plurality of rotor magnets being opposite to the outer side of each of the plurality of rotor magnets and facing the stator; and
wherein a size of the spacing ranges from 3 mm to 10 mm.

2. The motor of claim 1, wherein the first direction and the second direction are substantially orthogonal to each other.

3. The motor of claim 1, wherein:
each of the plurality of rotor magnets has an inner surface, an outer surface, and an edge surface; and
the at least one of the stator poles corresponds to a distal portion of the stator.

4. The motor of claim 3, wherein the distal portion of the stator is configured to directly face the inner surface of each of the plurality of rotor magnets at an instantaneous point in time as the rotor housing rotates relative to the stator.

5. The motor of claim 3, wherein each of the plurality of sensors is positioned in a location proximal to the edge surface of one of the plurality of rotor magnets, and the leakage flux of the one of the plurality of rotor magnets includes a majority of the magnetic flux from the one of the plurality of rotor magnets that is measured by at least one of the plurality of sensors and extends from the edge surface.

6. The motor of claim 3, wherein a top surface of each of the plurality of sensors is configured to directly face the edge surface of one of the plurality of rotor magnets at an instantaneous point in time as the rotor housing rotates relative to the stator.

7. The motor of claim 1, wherein the plurality of rotor magnets are disposed on an interior surface of the rotor housing and located in a gap between the interior surface of the rotor housing and the stator poles.

8. The motor of claim 1, wherein the plurality of sensors are configured to generate a measurement signal indicative of a flux density of the leakage flux.

9. The motor of claim 1, wherein:
the plurality of sensors are of a same type;
the plurality of sensors comprise at least two horizontal-type linear Hall effect sensors; and
the plurality of sensors comprise a first sensor and a second sensor spaced apart by an angle θ electrical degrees relative to a rotational axis of a rotor.

10. A motor comprising:
a rotor housing comprising a plurality of rotor magnets spaced apart from each other by a spacing and each of the plurality of rotor magnets having an inner surface, an outer surface, and an edge surface located between the inner surface and the outer surface;
a stator disposed within the rotor housing and comprising:
a distal portion facing the inner surface of one of the plurality of rotor magnets; and
a base supporting the distal portion; and
a plurality of sensors each positioned in a gap between the edge surface of one of the plurality of rotor magnets and a flange portion of the base, the flange portion facing the edge surface of the one of the plurality of rotor magnets, and the edge surface and the inner surface of the one of the plurality of rotor magnets lying on planes that are non-parallel to each other,
wherein:
the plurality of sensors are arranged to measure a leakage flux generated by the plurality of rotor magnets as the rotor housing rotates relative to the stator, and
wherein a size of the spacing ranges from 3 mm to 10 mm.

11. The motor of claim 10, wherein a top surface of each of the plurality of sensors is configured to directly face the edge surface of one of the plurality of rotor magnets at an instantaneous point in time as the rotor housing rotates relative to the stator.

12. The motor of claim 10, wherein the plurality of sensors are configured in an orientation to the plurality of rotor magnets to avoid detection of a main flux of the plurality of rotor magnets, the main flux extending towards the distal portion of the stator.

13. The motor of claim 10, wherein each of the plurality of rotor magnets is disposed on an interior surface of the rotor housing.

14. The motor of claim 13, wherein the plurality of rotor magnets are located in a gap between the interior surface of the rotor housing and the distal portion of the stator.

15. The motor of claim 13, wherein the outer surface of each of the plurality of rotor magnets is in direct contact with the interior surface of the rotor housing.

16. The motor of claim 10, wherein the inner surface and the outer surface of each of the plurality of rotor magnets are laterally opposite to each other.

17. The motor of claim 10, wherein:
the plurality of sensors comprise a linear Hall effect sensor; and
the linear Hall effect sensor is of a horizontal-type configuration and disposed horizontally with respect to a surface of a flexible printed circuit (FPC).

18. The motor of claim 10, wherein a distance from a top surface of each of the plurality of sensors to the edge surface of one of the plurality of rotor magnets ranges from about 0.2 mm to about 0.8 mm when the plurality of sensors are positioned nearest to the edge surface.

19. A motor comprising: a rotor housing comprising a plurality of rotor magnets spaced apart from each other by a spacing ranging from 3 mm to 10 mm, each of the plurality of rotor magnets having an inner surface, an outer surface, and an edge surface located between the inner surface and the outer surface; a stator disposed within the rotor housing and comprising: a distal portion facing the inner surface of one of the plurality of rotor magnets; and a base supporting the distal portion; and a flexible printed circuit (FPC) disposed between a rigid electromagnetic shielding sheet and a flange portion of the base; a plurality of sensors disposed on the FPC and each positioned in a gap between the edge surface of one of the plurality of rotor magnets and the flange portion of the base, the flange portion facing the edge surface of the one of the plurality of rotor magnets, and the edge surface and the inner surface of the one of the plurality of rotor magnets lying on planes that are non-parallel to each other, wherein the plurality of sensors are arranged to measure a leakage flux generated by the plurality of rotor magnets as the rotor housing rotates relative to the stator.

\* \* \* \* \*